US012218446B2

(12) United States Patent
Miyazaki et al.

(10) Patent No.: US 12,218,446 B2
(45) Date of Patent: Feb. 4, 2025

(54) ELECTRICAL CONNECTOR PAIR

(71) Applicant: I-PEX Inc., Kyoto (JP)

(72) Inventors: Yuki Miyazaki, Ogori (JP); Tadamichi Yayoshi, Machida (JP); Takashi Masunaga, Ogori (JP)

(73) Assignee: I-PEX Inc., Kyoto (JP)

( * ) Notice: Subject to any disclaimer, the term of this patent is extended or adjusted under 35 U.S.C. 154(b) by 421 days.

(21) Appl. No.: 17/782,965

(22) PCT Filed: Dec. 1, 2020

(86) PCT No.: PCT/JP2020/044603
§ 371 (c)(1),
(2) Date: Jun. 6, 2022

(87) PCT Pub. No.: WO2021/117539
PCT Pub. Date: Jun. 17, 2021

(65) Prior Publication Data
US 2023/0006378 A1 Jan. 5, 2023

(30) Foreign Application Priority Data
Dec. 9, 2019 (JP) ................................ 2019-222381

(51) Int. Cl.
*H01R 12/71* (2011.01)
*H01R 13/516* (2006.01)
*H01R 13/6471* (2011.01)

(52) U.S. Cl.
CPC ......... *H01R 12/716* (2013.01); *H01R 13/516* (2013.01); *H01R 13/6471* (2013.01)

(58) Field of Classification Search
CPC .. H01R 12/716; H01R 12/718; H01R 13/516; H01R 13/518; H01R 13/6461; H01R 13/6471
USPC .............................................. 439/55, 65, 74
See application file for complete search history.

(56) References Cited

U.S. PATENT DOCUMENTS

| | | | |
|---|---|---|---|
| 4,762,500 | A | 8/1988 | Dola et al. |
| 5,195,899 | A | 3/1993 | Yatsu et al. |
| 5,813,871 | A | 9/1998 | Grabbe et al. |
| 2017/0070008 | A1 | 3/2017 | Soga |

FOREIGN PATENT DOCUMENTS

| | | | |
|---|---|---|---|
| EP | 3 051 634 A1 | | 8/2016 |
| JP | H01-501982 A | | 7/1989 |
| JP | H05135826 A | | 6/1993 |
| JP | H07-014580 U | | 3/1995 |
| JP | H08-241762 A | | 9/1996 |
| JP | 2017-050235 A | | 3/2017 |
| WO | 2015/045623 A1 | | 4/2015 |
| WO | 2020/150075 A1 | | 7/2020 |

*Primary Examiner* — Khiem M Nguyen
(74) *Attorney, Agent, or Firm* — Howard & Howard Attorneys PLLC

(57) ABSTRACT

An electrical connector pair 1 includes a receptacle connector 1*a* and a plug connector 1*b*. The receptacle connector 1*a* includes a first partition wall 12*a*, and the plug connector 1*b* includes a second partition wall 12*b*. When the receptacle connector 1*a* and the plug connector 1*b* are fitted together, the first partition wall 12*a* partitions a portion of the boundary between a third holder and a fourth holder where the second partition wall 12*b* is not formed such that a first contact 10*a* and a third contact 10*b* cannot be seen from a second contact and a fourth contact.

13 Claims, 44 Drawing Sheets

ELECTRICAL CONNECTOR PAIR

CROSS-REFERENCE TO RELATED APPLICATIONS

This application is a national phase application of International Patent Application No. PCT/JP2020/044603, filed Dec. 1, 2020, which claims priority to JP Patent Application No. 2019-222381, filed Dec. 9, 2019, the disclosures of which are hereby incorporated by reference in their entirety.

TECHNICAL FIELD

The present disclosure relates to an electrical connector pair.

BACKGROUND ART

Patent Literature 1 describes a connector provided with a noise countermeasure. A metal conductive member (shield member) is mounted on an outer peripheral surface of the connector. As a result, the connector reduces noise.

CITATION LIST

Patent Literature

Patent Literature 1: International Publication No. WO 2015/045623

SUMMARY OF INVENTION

Technical Problem

Increases in the communication speeds of signals in recent years have led to a need for further noise countermeasures. This is because, when the communication speed of a signal increases, the noise emitted from one of the transmission lines that transmits the signal is introduced into another transmission line that transmits the signal, and electric coupling of the two transmission lines may increase.

In light of this problem, an object of the present disclosure is to provide an electrical connector pair that is capable of reducing the noise that is introduced into the transmission lines of a signal.

Solution to Problem

An electrical connector pair according to a first aspect of the present disclosure that achieves the objective described above is an electrical connector pair including a first connector mounted on a first substrate; and a second connector mounted on a second substrate, wherein the first connector includes an electrically conductive first contact that connects to a signal electrode of the first substrate, an electrically conductive second contact that connects to the signal electrode of the first substrate, an electrically conductive first periphery surrounding wall that, when viewed from a direction normal to a main surface of the first substrate, is arranged so as to surround the first contact and the second contact, and that connects to a ground electrode of the first substrate, an insulating first housing that includes a first holder that insulates and holds the first contact and the first periphery surrounding wall, and a second holder that insulates and holds the second contact and the first periphery surrounding wall, and an electrically conductive first partition wall that is held by the first housing so as to partition a portion of a boundary between the first holder and the second holder in a state insulated from the first contact and the second contact, and that is grounded to the first substrate, the second connector includes an electrically conductive third contact that connects to a signal electrode of the second substrate, and that contacts the first contact when the first connector and the second connector are fitted together, an electrically conductive fourth contact that connects to the signal electrode of the second substrate, and that contacts the second contact when the first connector and the second connector are fitted together, an electrically conductive second periphery surrounding wall that, when viewed from a direction normal to a main surface of the second substrate, is arranged so as to surround the third contact and the fourth contact, and that connects to a ground electrode of the second substrate, an insulating second housing that includes a third holder that insulates and holds the third contact and the second periphery surrounding wall, and a fourth holder that insulates and holds the fourth contact and the second periphery surrounding wall, and an electrically conductive second partition wall that is held by the second housing so as to partition a portion of a boundary between the third holder and the fourth holder in a state insulated from the third contact and the fourth contact, and that is grounded to the second substrate, and when the first connector and the second connector are fitted together, the first partition wall partitions a portion of boundary between the third holder and the fourth holder where the second partition wall is not formed, such that the first contact and the third contact cannot be seen from the second contact and the fourth contact.

A configuration is possible in which the first partition wall includes a first end that contacts the first substrate, and a first ground connector that connects to the ground electrode of the first substrate is provided on the first end.

A configuration is possible in which the second partition wall includes a second end that contacts the second substrate, and a second ground connector that connects to the ground electrode of the second substrate is provided on the second end.

A configuration is possible in which, in the first connector, the first partition wall is arranged such that the first contact cannot be seen from the second contact, and in the second connector, the second partition wall is arranged such that the third contact cannot be seen from the fourth contact.

A configuration is possible in which the first partition wall and the second partition wall contact each other when the first connector and the second connector are fitted together.

A configuration is possible in which the first partition wall and the second partition wall engage with each other when the first connector and the second connector are fitted together.

A configuration is possible in which, when the first connector and the second connector are fitted together, the second partition wall is arranged so as to overlap the first partition wall when viewing from the first contact and the third contact.

A configuration is possible in which, when the first connector and the second connector are fitted together, the first, second, third, and fourth contacts are doubly surrounded by the first periphery surrounding wall and the second periphery surrounding wall.

A configuration is possible in which the first periphery surrounding wall and the second periphery surrounding wall engage with each other when the first connector and the second connector are fitted together.

A configuration is possible in which an electrically conductive first coupler is provided that couples the first partition wall and the first periphery surrounding wall, and an electrically conductive second coupler is provided that couples the second partition wall and the second periphery surrounding wall.

A configuration is possible in which the first coupler is a plate-like member that intersects a line normal to the main surface of the first substrate, and the second coupler is a plate-like member that intersects a line normal to the main surface of the second substrate A configuration is possible in which an annular protrusion is formed, by the first partition wall, the first periphery surrounding wall, and the first coupler, that surrounds the first contact, and a recess is formed, by the second partition wall, the second periphery surrounding wall, and the second coupler, that surrounds the second contact, and into which the protrusion fits when the first connector and the second connector are fitted together.

A configuration is possible in which, in the first connector, a pair of the first holder is arranged so as to sandwich the second holder, and in the second connector, a pair of the third holder is arranged so as to sandwich the fourth holder.

Advantageous Effects of Invention

With the electrical connector pair according to the present disclosure, the first connector includes the electrically conductive first partition wall that partitions the first contact and the second contact, and the second connector includes the electrically conductive second partition wall that partitions the third contact and the fourth contact. When the first connector and the second connector are fitted together, the first partition wall partitions the portion of boundary between the third holder and the fourth holder where the second partition wall is not formed, such that first contact and the third contact cannot be seen from second contact and the fourth contact. With such a configuration, the first partition wall and the second partition wall complement each other and, thereby, can block electromagnetic waves that radiate from the second and fourth contacts or the first and third contacts. As a result, the noise that is introduced into the transmission lines of the signal can be reduced.

DESCRIPTION OF EMBODIMENTS

Figure 1A:
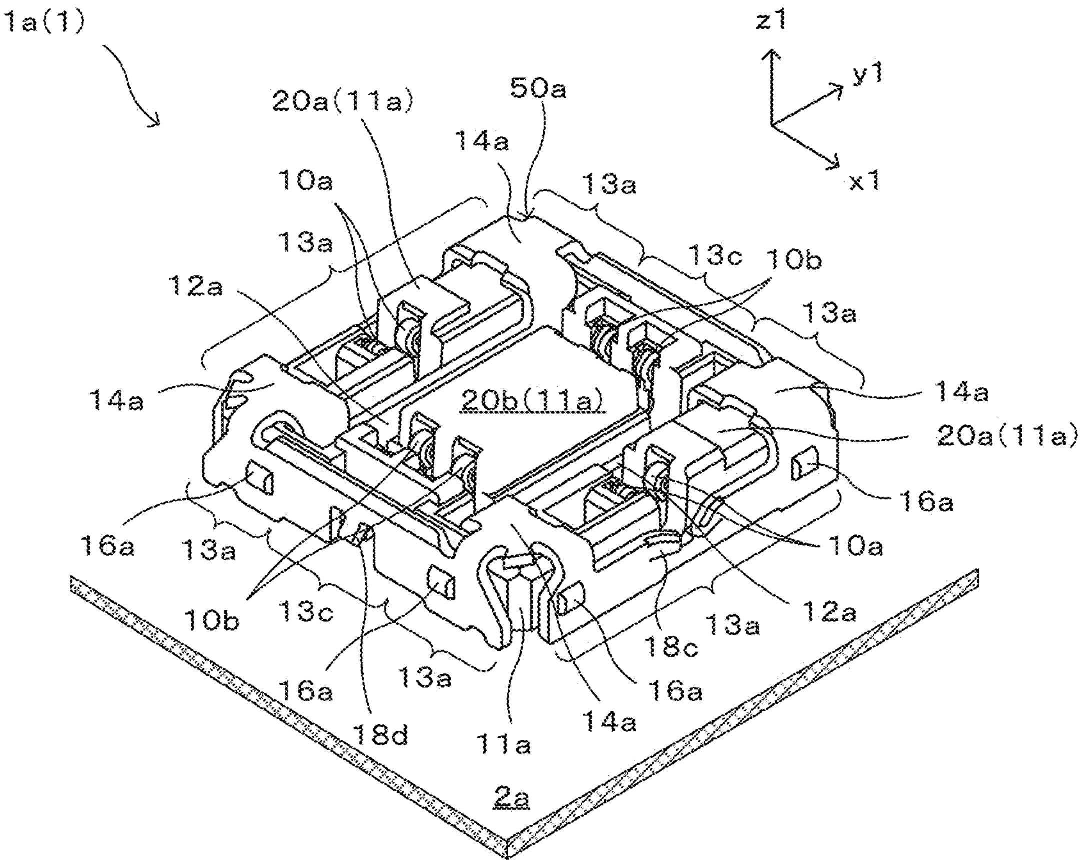
FIG. 1A is a perspective view of a receptacle connector of an electrical connector pair according to Embodiment 1 of the present disclosure.

Hereinafter, embodiments of the present disclosure are described in detail while referencing the drawings. Note that, in the drawings, identical or corresponding components are denoted with the same reference numerals.

Embodiment 1

First, Embodiment 1 of the present disclosure is described. An electrical connector pair 1 according to the present embodiment includes a receptacle connector 1*a*, as a first connector, illustrated in FIG. 1A, and a plug connector 1*b*, as a second connector, illustrated in FIG. 1B.

Figure 1B:
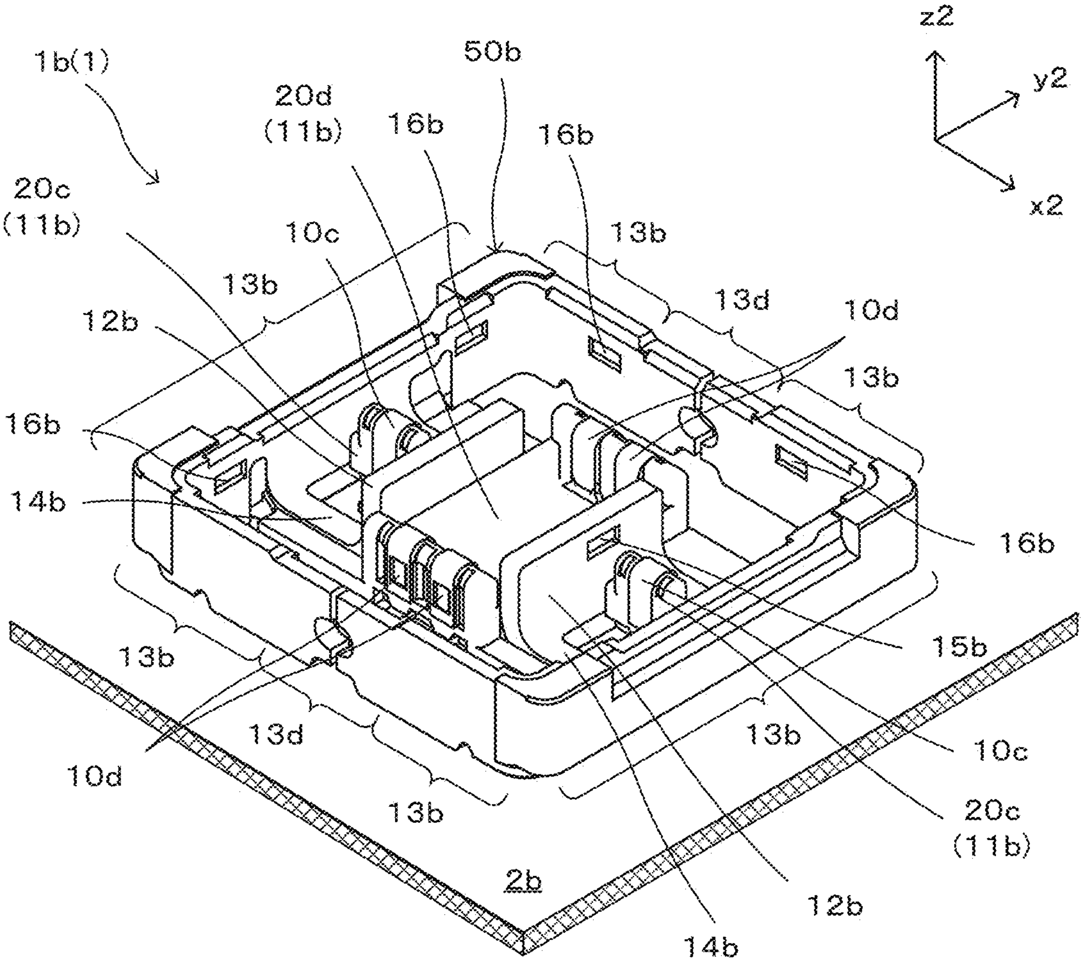
FIG. 1B is a perspective view of a plug connector of the electrical connector pair according to Embodiment 1 of the present disclosure.

As illustrated in FIG. 1A, the receptacle connector 1*a* is mounted on a main surface of a first substrate 2*a*. As illustrated in FIG. 1B, the plug connector 1*b* is mounted on a main surface of a second substrate 2*b*. Here, the term "main surface" refers to surfaces of the first substrate 2*a* and the second substrate 2*b* on which circuit patterns are formed and electronic components are mounted, and refers to the pair of surfaces that have the greatest area of the substrate surfaces.

In the present embodiment, a three-axis Cartesian coordinate system is defined in which an x1-axis direction and a y1-axis direction are in-plane directions of the main surface of the first substrate 2*a*, and a z1-axis direction is a direction normal to the main surface of the first substrate 2*a*. Here, the x1-axis direction is the longitudinal direction of the receptacle connector 1*a*. Additionally, a three-axis Cartesian coordinate system is defined in which an x2-axis direction and a y2-axis direction are in-plane directions of the main surface of the second substrate 2*b*, and a z2-axis direction is a direction normal to the main surface of the second substrate 2*b*. Here, the x2-axis direction is the longitudinal direction of the plug connector 1*b*.

When the receptacle connector 1*a* and the plug connector 1*b* are fitted together, the receptacle connector 1*a* and the plug connector 1*b* are electrically connected, thereby forming the electrical connector pair 1, and the electronic circuit of the first substrate 2*a* and the electronic circuit of the second substrate 2*b* are electrically connected to each other.

Receptacle Connector

Figure 2A:
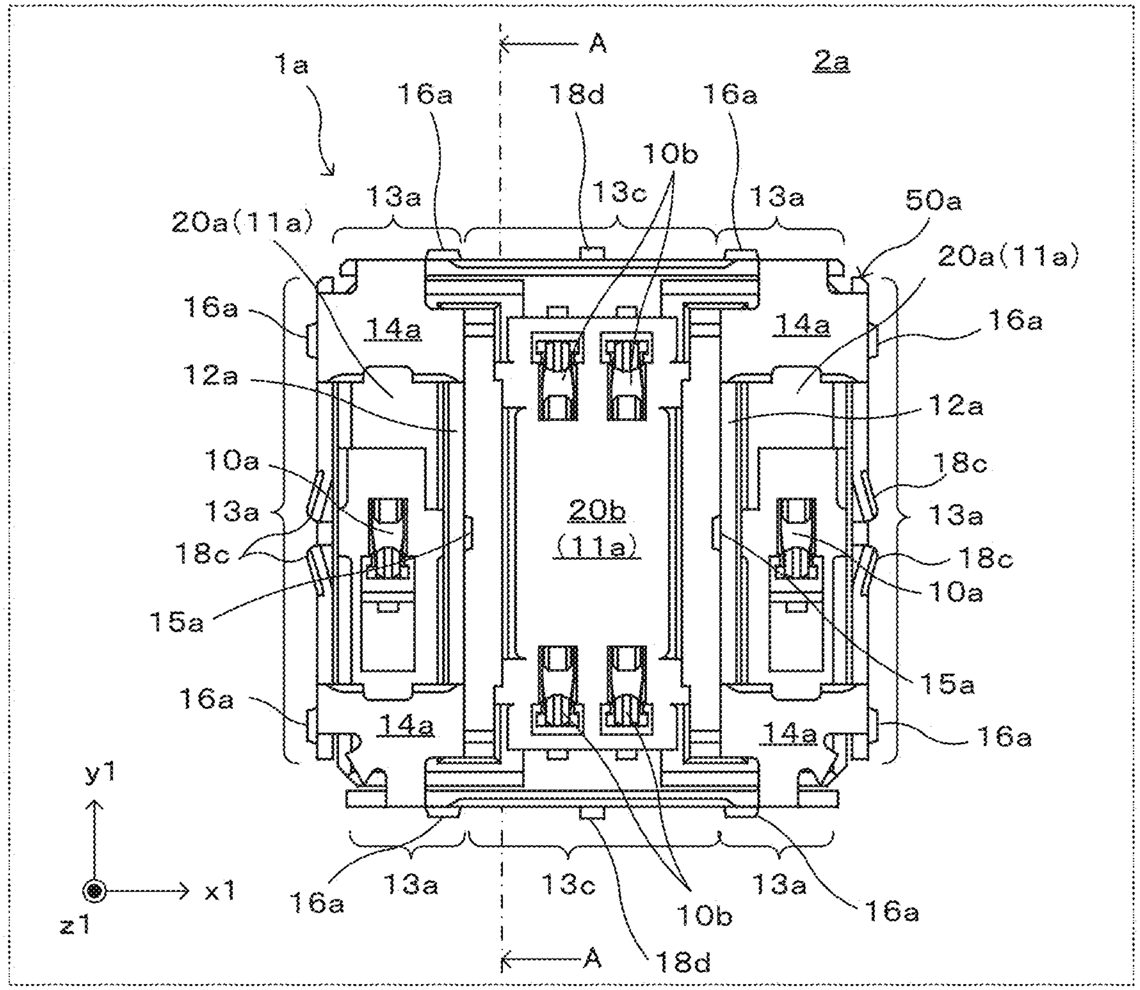
FIG. 2A is a top view of the receptacle connector of FIG. 1A.
Figure 2B:
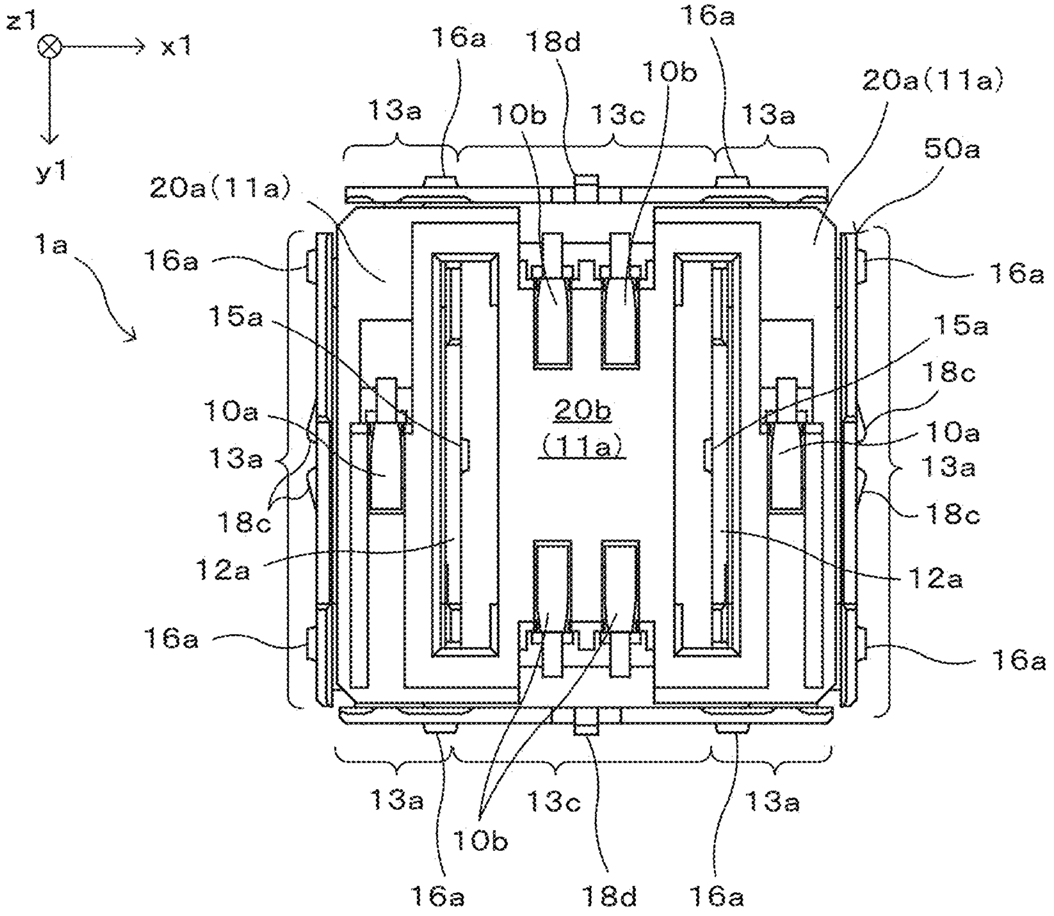
FIG. 2B is a bottom view of the receptacle connector of FIG. 1A.
Figure 3A:
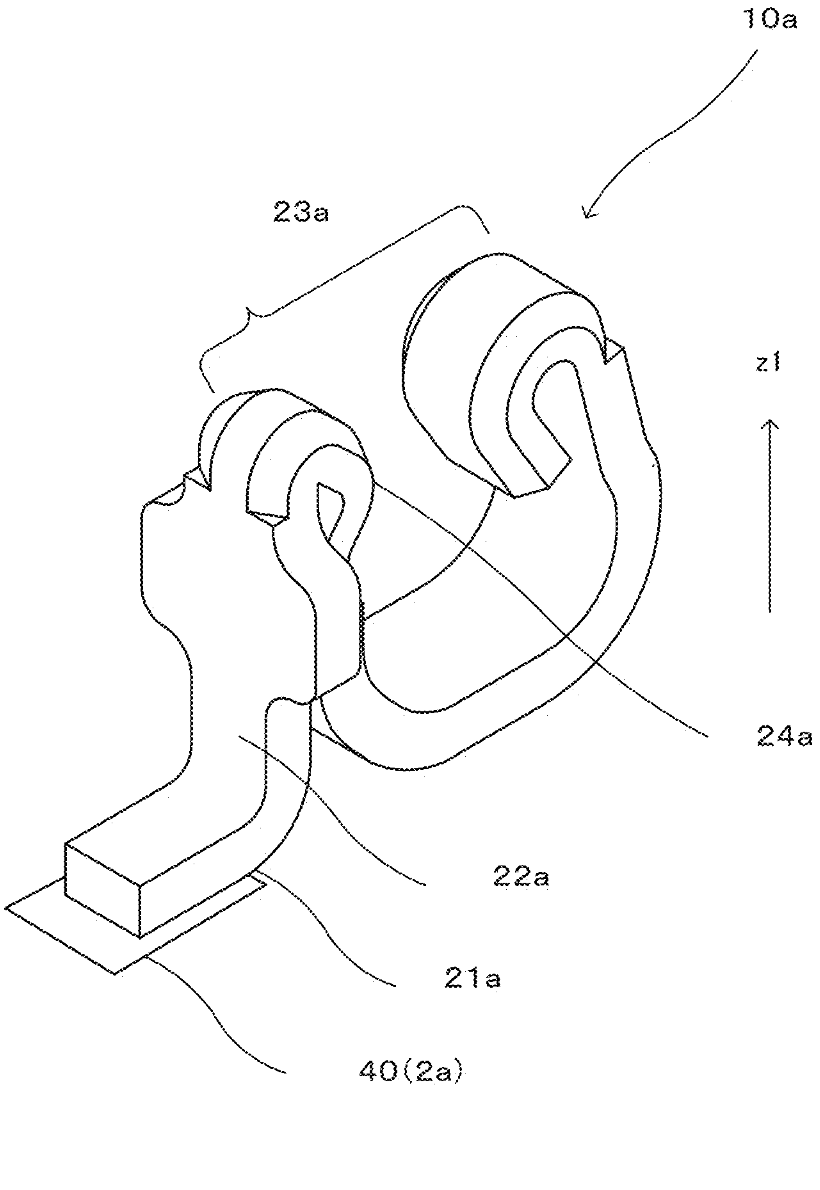
FIG. 3A is a perspective view illustrating a first contact.
Figure 3B:
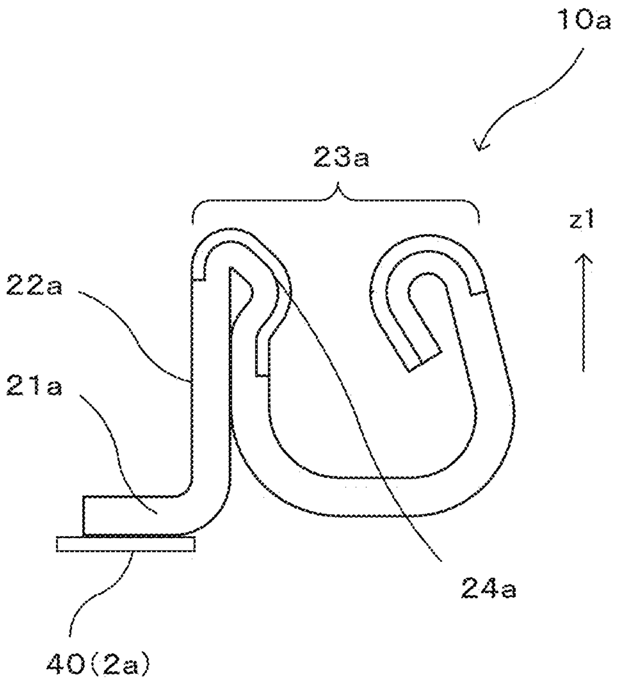
FIG. 3B is a first side view illustrating the first contact.
Figure 3C:
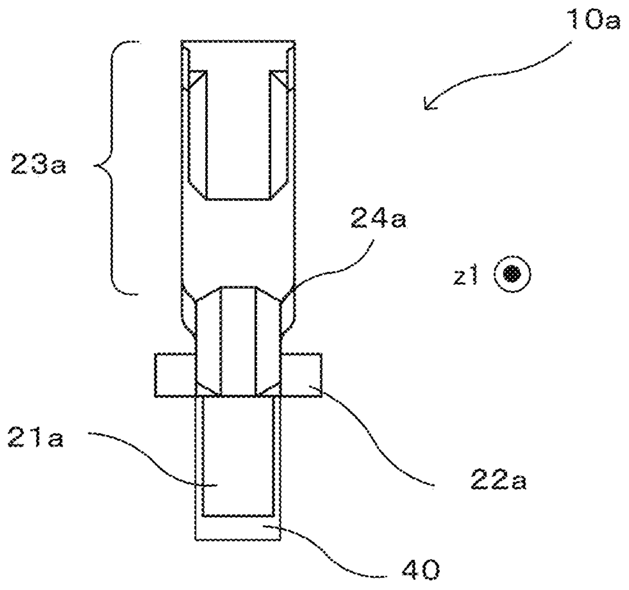
FIG. 3C is a top view illustrating the first contact.
Figure 3D:
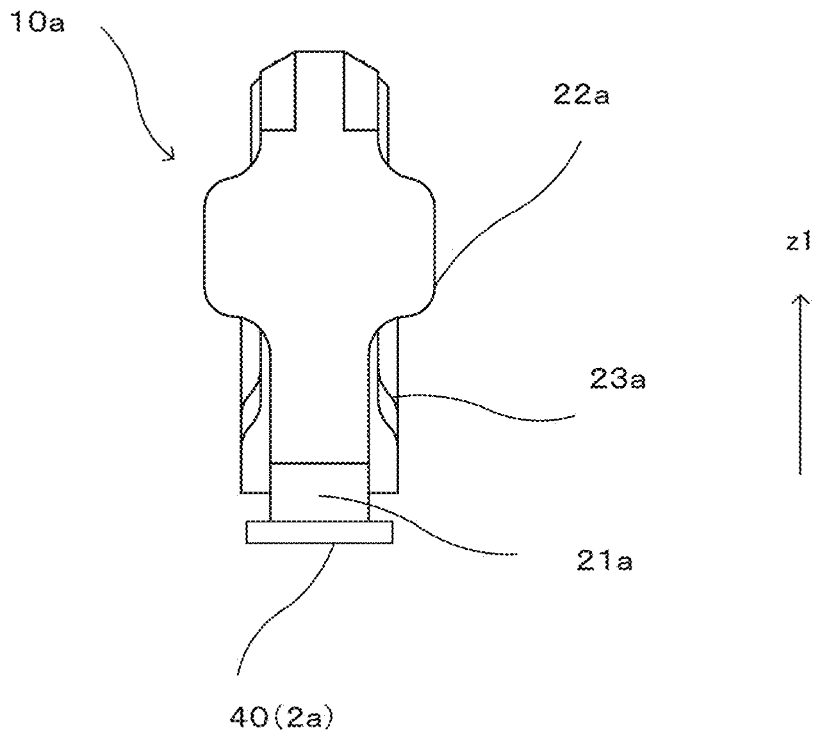
FIG. 3D is a second side view illustrating the first contact.

Firstly, the configuration of the receptacle connector 1*a* is described. As illustrated in FIGS. 2A and 2B, the receptacle connector 1*a* includes a first contact 10*a* that is an electrically conductive member, a second contact 10*b* that is an electrically conductive member, a first housing 11*a* that is an insulating member, a first partition wall 12*a* that is an electrically conductive member, a first outer wall 13*a* that is an electrically conductive member, and a third outer wall 13*c* that is an electrically conductive member.

As illustrated in FIGS. 3A, 3B, 3C, and 3D, in one example, the first contact 10*a* is a metal member and has a bent shape that is, overall, an elongated plate-like shape. A substrate connector 21*a* is formed at a first end of the first contact 10*a*. The substrate connector 21*a* is soldered to a signal electrode 40 of the first substrate 2*a*.

A rising portion 22*a* of the first contact 10*a* is bent 90 degrees from the substrate connector 21*a* and extends in the +z1-axis direction. A section partway along the rising portion 22*a* is widened, and the first contact 10*a* is locked to first housing 11*a* by that widened section. The rising portion 22*a* is bent in a U-shape at a +z end thereof to form a U-shaped contact contactor 23*a*, in which a recess facing the +z side is formed, on a tip of the rising portion 22*a*. A contact contactor 23*b* (see FIG. 8A) of the third contact 10*c* of the plug connector 1*b* is fitted in the contact contactor 23*a*. A protrusion 24*a* that fits in a recess 24*b* (see FIG. 8A) of the second contact 10*b* is provided on the contact contactor 23*a*.

As illustrated in FIGS. 2A and 2B, when viewed from the z1-axis direction, the longitudinal direction (long side) of the first contact 10*a* is arranged in a direction matching the y1-axis direction. Note that, in the present specification, the expression "when viewed from . . . " or "when viewing from . . . " is used when setting the direction of viewing relative to a subject, and describing the apparent structure of that subject visible from that direction.

In the receptacle connector 1*a*, a pair of members is provided as the first contact 10*a*. One first contact 10*a* is arranged at each of the two ends in the x1-axis direction, along the main surface of the first substrate 2*a*.

The shape of the second contact 10*b* is the same as the shape of the first contact 10*a* illustrated in FIGS. 3A to 3D. As with the first contact 10*a*, in the second contact 10*b*, the substrate connector 21*a* is soldered to the signal electrode 40 of the first substrate 2*a*. When viewing from the z1-axis direction, the second contact 10*b* is arranged such that the longitudinal direction thereof matches the y1-axis direction.

Figure 4:
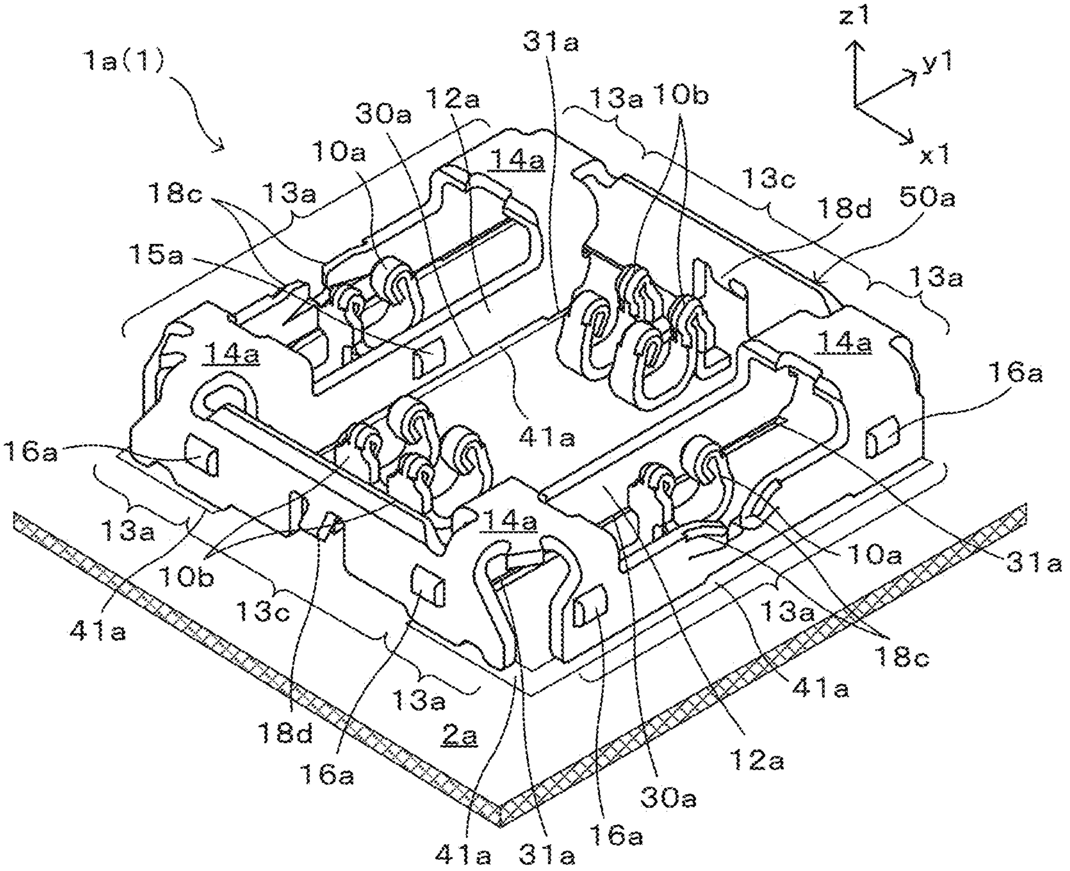
FIG. 4 is a perspective view illustrating the configuration of the receptacle connector, in which portions formed by electrically conductive members are extracted.

As illustrated in FIG. 4, in the receptacle connector 1*a*, four of the second contact 10*b* are arranged at a center portion in the x1-axis direction. In the receptacle connector 1*a*, the second contacts 10*b* form a 2×2 matrix in which two second contacts 10*b* are arranged in the x1-axis direction, and two second contacts 10*b* are arranged in the y1-axis direction. Note that, in the present embodiment, the positional relationship of each of the first contacts 10*a* and the second contacts 10*b* is defined such that a spacing between the second contacts 10*b* is shorter than a spacing between the second contacts 10*b* and the first contacts 10*a*.

The first housing 11*a* is a member that serves as the parent body of the receptacle connector 1*a*, and has the x1-axis direction as the longitudinal direction. A resin, for example, is used as the material of the first housing 11*a*. The first housing 11*a* includes a back surface that faces the first substrate 2*a* and a front surface that faces the plug connector 1*b* when fitting.

The first housing 11*a* is partitioned into a plurality of regions along the in-plane directions of the first substrate 2*a*, and a holder of each of the contacts is formed in each region. The first housing 11*a* includes a first holder 20*a* that holds the first contact 10*a*, and a second holder 20*b* that holds the second contact 10*b*.

In the receptacle connector 1*a*, a pair of the first holder 20*a* is arranged along the x1-axis direction so as to sandwich the second holder 20*b*. Specifically, the second holder 20*b* is arranged at the center in the x1-axis direction, and the first holder 20*a* is arranged at each end in the x1-axis direction.

The first contact 10*a*, the second contact 10*b*, and the first partition wall 12*a* are press-fit into the first housing 11*a*, and voids for holding are provided. Additionally, voids, into which the constituents of the plug connector 1*b* enter when fitted together with the plug connector 1*b*, are provided in the first housing 11*a*. Furthermore, voids, for confirming connections with the first contact 10*a*, the second contact 10*b*, and the signal electrode 40, are provided in the first housing 11*a*.

Figure 5:
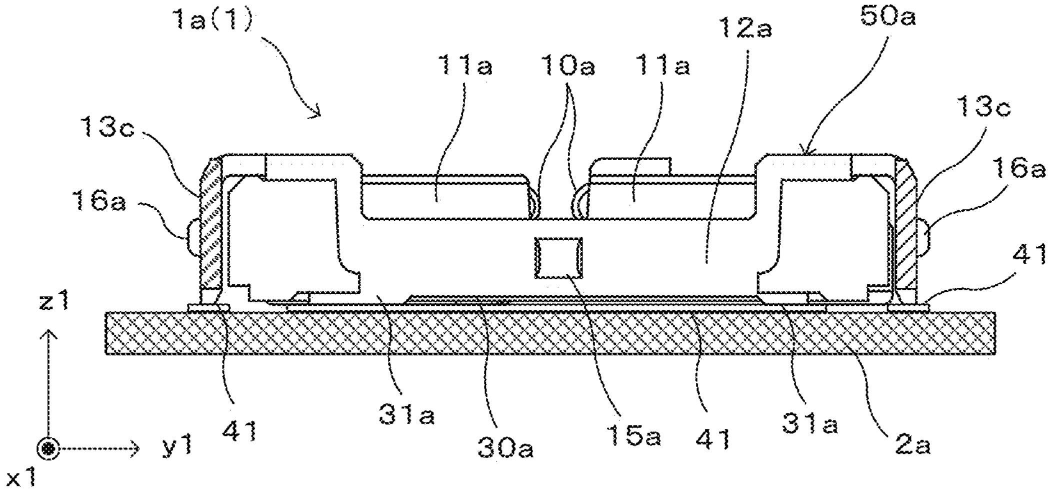
FIG. 5 is a cross-sectional view taken along line A-A of FIG. 2A.

In one example, the first partition wall 12*a* is a metal member, and is held by the first housing 11*a* so as to partition the first holder 20*a* and the second holder 20*b*. As illustrated in FIGS. 4 and 5, the first partition wall 12*a* is held by the first housing 11*a* so as to partition a portion of the boundary between the first holder 20*a* and the second holder 20*b* in a state insulated from the first contact 10*a* and the second contact 10*b*. Since the first holder 20*a* is provided at both ends in the x1-axis direction of the second holder 20*b*, the first partition wall 12*a* is provided at each of both ends in the x1-axis direction of the second holder 20*b*. The two first partition walls 12*a* each extend in the y1-axis direction and partition the first holder 20*a* and the second holder 20*b*.

As illustrated in FIGS. 4 and 5, the first partition wall 12*a* includes a first end 30*a* that contacts the first substrate 2*a*. A first ground connector 31*a* that connects to the ground electrode 41 of the first substrate 2*a* is provided on the first end 30*a*. That is, the first partition wall 12*a* is grounded to the first substrate 2*a*.

A stopper 15*a* is provided on the first partition wall 12*a*. The stopper 15*a* projects convexly from the wall at a center portion in the y1-axis direction of the first partition wall 12*a*.

The receptacle connector 1*a* includes a first shell 50*a* that is arranged so as to, when viewed from the z1-axis direction, surround the first housing 11*a*, the first contact 10*a*, and the second contact 10*b* on four sides. In one example, the first shell 50*a* is a metal member, and the first outer wall 13*a* and the third outer wall 13*c* are portions of the first shell 50*a*. The first shell 50*a* is held by the first holder 20*a* in a state insulated from the first contact 10*a*, and is held by the second holder 20*b* in a state insulated from the second contact 10*b*. In the present embodiment, the first shell 50*a* corresponds to a first periphery surrounding wall.

The first outer wall 13*a* is a portion of the first shell 50*a* that, when viewed from the z1-axis direction, surrounds the first holder 20*a* together with the first partition wall 12*a*. More specifically, the first outer wall 13*a* includes an opposing wall that opposes the first partition wall 12*a*, and side walls that respectively extend from each end of the opposing wall toward the third outer wall 13*c*. The first contact 10*a* is surrounded by the opposing wall and the side walls, and the first partition wall 12*a*.

As illustrated in FIG. 4, the first outer wall 13*a* is connected to the ground electrode 41 of the first substrate 2*a*. That is, the first outer wall 13*a* is grounded to the first substrate 2*a*. Additionally, as illustrated in FIGS. 2A and 2B, when viewed from the z1-axis direction, the first outer wall 13*a* is arranged outward from an outer shape that includes the end of the substrate connector 21*a* of the first contact 10*a*. In the present embodiment, the entire first contact 10*a* is surrounded by ground members.

Figure 6:
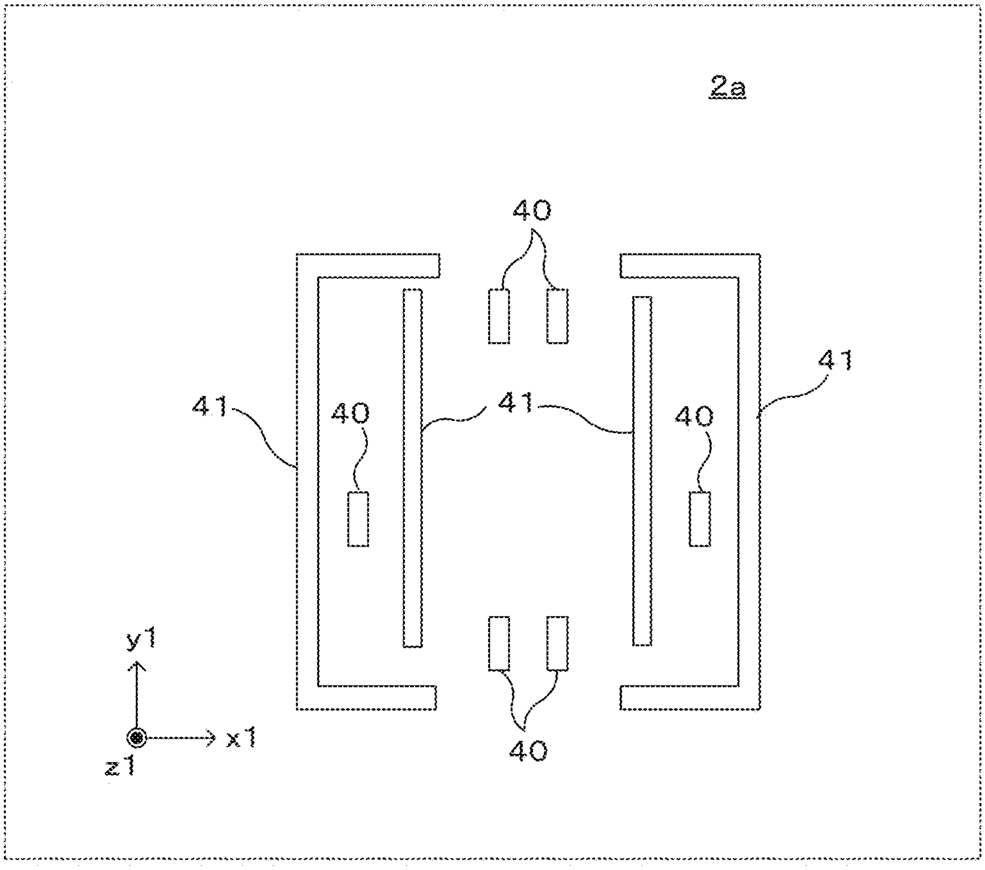
FIG. 6 is a drawing illustrating the arrangement of a signal electrode and a ground electrode on a first substrate.

As illustrated in FIG. 6, the signal electrode 40 and the ground electrode 41 are provided on the first substrate 2*a*. Arrangement locations of the signal electrode 40 correspond to arrangement locations of the first contact 10*a* and the second contact 10*b* (see FIG. 2B), and arrangement locations of the ground electrode 41 correspond to arrangement locations of the first partition wall 12*a* and the first outer wall 13*a*.

As illustrated in FIGS. 2A and 2B, the first shell 50*a* includes an electrically conductive first coupler 14*a* that couples the first partition wall 12*a* and the first outer wall 13*a*. The first coupler 14*a* is a plate-like member that intersects the line normal to the main surface of the first substrate 2*a* (straight line in the z1-axis direction). As illustrated in FIG. 4, the first coupler 14*a* couples the first partition wall 12*a* and the first outer wall 13*a* on the side far from the first substrate 2*a*. Due to this, an annular (frame-like) protrusion is formed, by the first partition wall 12*a*, the first outer wall 13*a*, and the first coupler 14*a*, that surrounds the first contact 10*a*. This annular protrusion functions as an electromagnetic shielding member between the first contact 10*a* and outside.

As illustrated in FIGS. 2A and 2B, when viewing from the z1-axis direction, the third outer wall 13*c* is integrated with the first outer wall 13*a*, and surrounds the first housing 11*a* on four sides. The third outer wall 13*c* is a portion that, when viewed from the z1-axis direction, surrounds the second holder 20*b* of the first housing 11*a* together with the first partition wall 12*a*. Note that the third outer wall 13*c* can be regarded as an electrically conductive member that connects a pair of the first outer walls 13*a* to each other.

As illustrated in FIG. 4, a stopper 16*a* is provided on the first outer wall 13*a*. The stopper 16*a* projects convexly from the wall main body, and is provided at two locations of the opposing wall, and one location on each of the side walls. Note that the stopper 16*a* may be provided on the third outer wall 13*c*. Furthermore, an elastic contactor 18*c* is provided on the first outer wall 13*a*. The elastic contactor 18*c* projects convexly from the wall main body of the first partition wall 12*a*. Additionally, in the present embodiment, an elastic contactor 18*d* is provided on the third outer wall 13*c*. The elastic contactor 18*d* projects convexly from the wall main body of the third outer wall 13*c*, and is provided at one location at the center in the x1-axis direction.

As illustrated in FIG. 4, in the receptacle connector 1*a*, the first contact 10*a* and the second contact 10*b* are partitioned by the first partition wall 12*a*. Additionally, the first contact 10*a* is surrounded on four sides by the first outer wall 13*a* and the first partition wall 12*a*, and the second contact 10*b* is surrounded on four sides by the third outer wall 13*c* and the first partition wall 12*a*. Moreover, as illustrated in FIGS. 4 and 5, in the receptacle connector 1*a*, the first partition wall 12*a* is arranged such that a large portion of the first contact 10*a* cannot be seen from the second contact 10*b*. In particular, the first partition wall 12*a* is arranged such that the substrate connector 21*a* of the first contact 10*a* cannot be seen from the substrate connector 21*a* of the second contact 10*b*.

Plug Connector

Figure 7A:
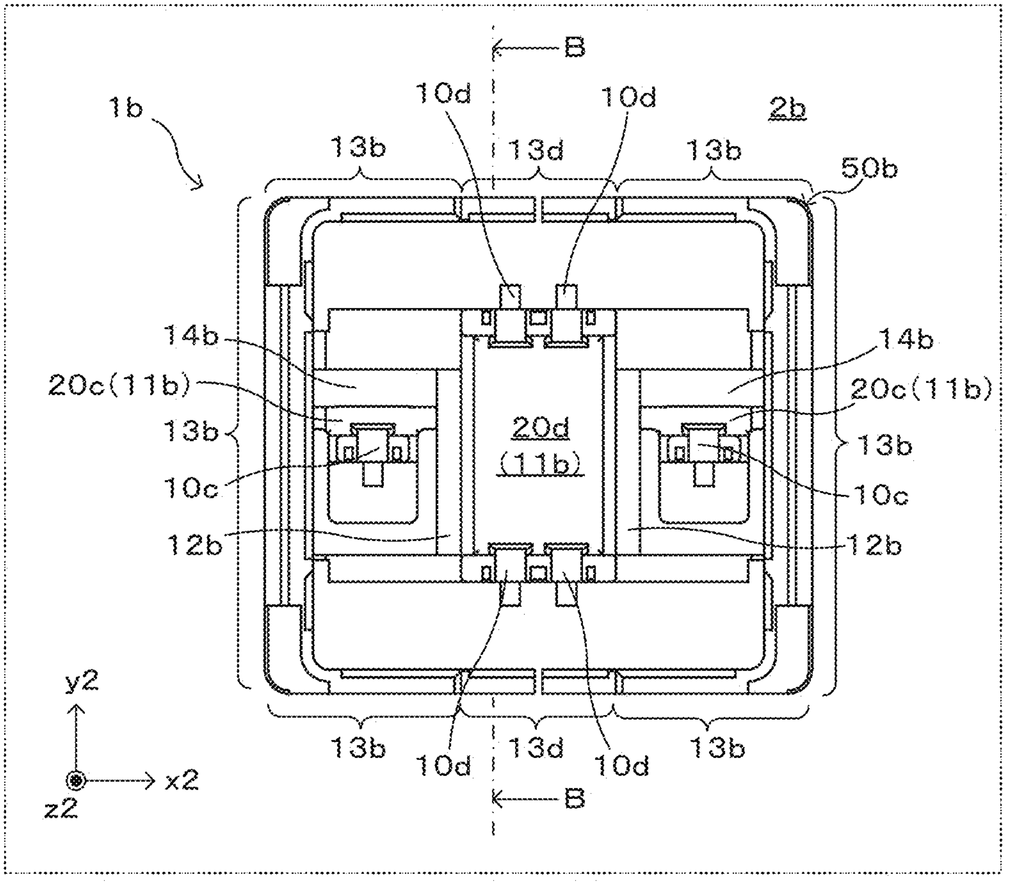
FIG. 7A is a top view of the plug connector of FIG. 1B.
Figure 7B:
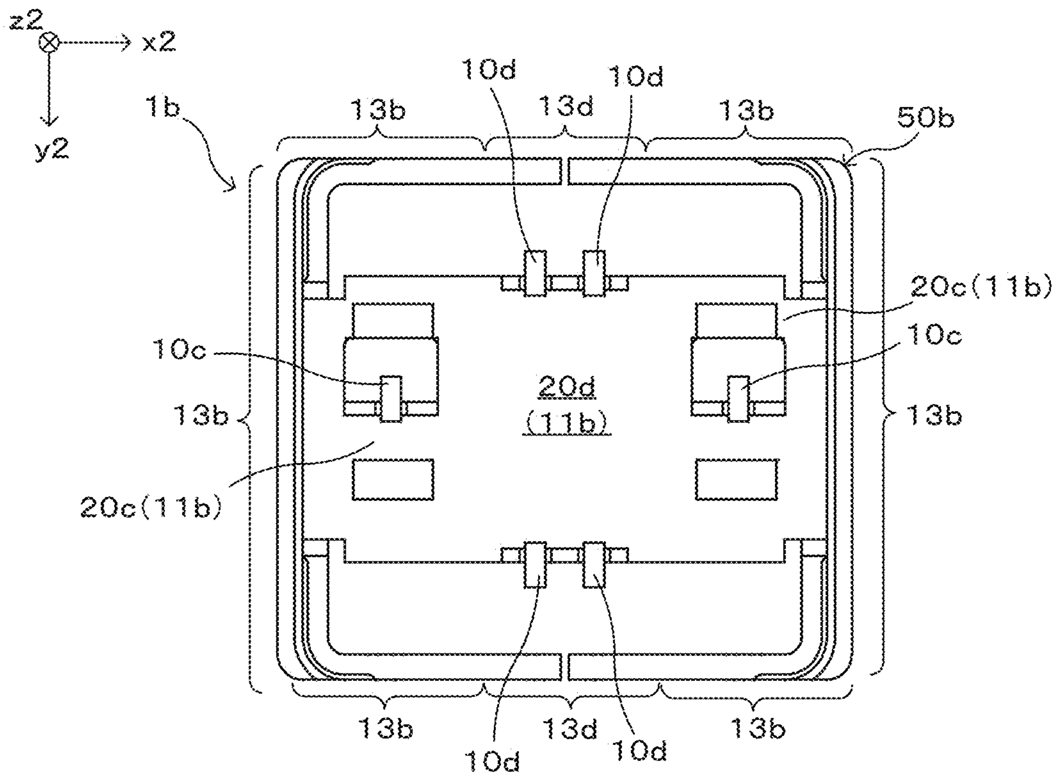
FIG. 7B is a bottom view of the plug connector of FIG. 1B.

Next, the configuration of the plug connector 1*b* is described. As illustrated in FIGS. 7A and 7B, the plug connector 1*b* includes a third contact 10*c* that is an electrically conductive member, a fourth contact 10*d* that is an electrically conductive member, a second housing 11*b* that is an insulating member, a second partition wall 12*b* that is an electrically conductive member, a second outer wall 13*b* that is an electrically conductive member, and a fourth outer wall 13*d* that is an electrically conductive member.

Figure 8A:
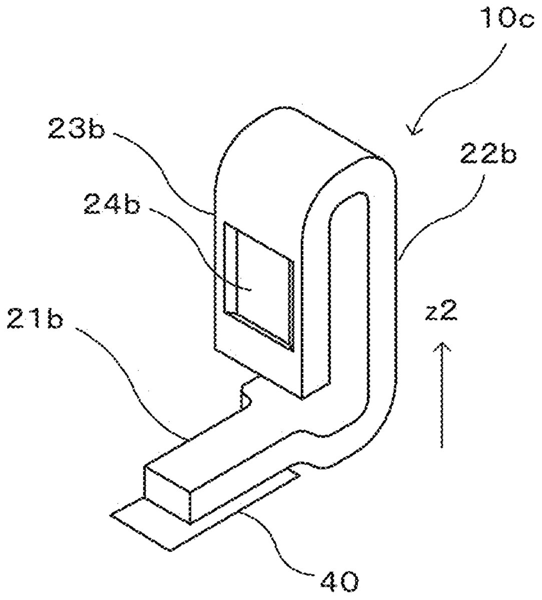
FIG. 8A is a perspective view illustrating a third contact.
Figure 8B:
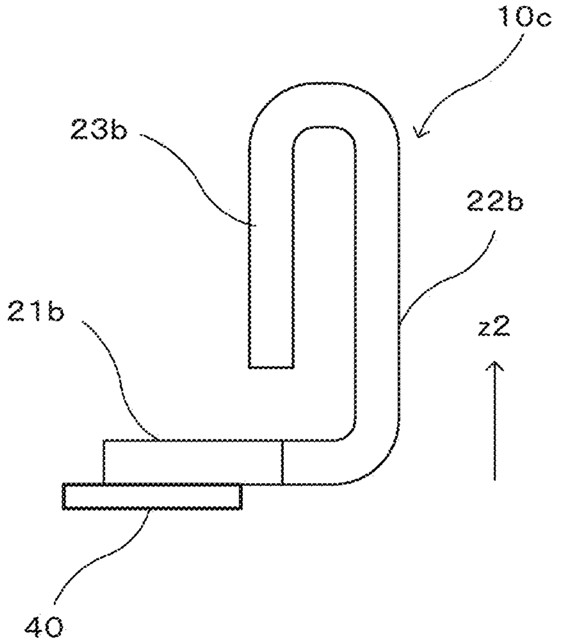
FIG. 8B is a first side view illustrating the third contact.
Figure 8C:
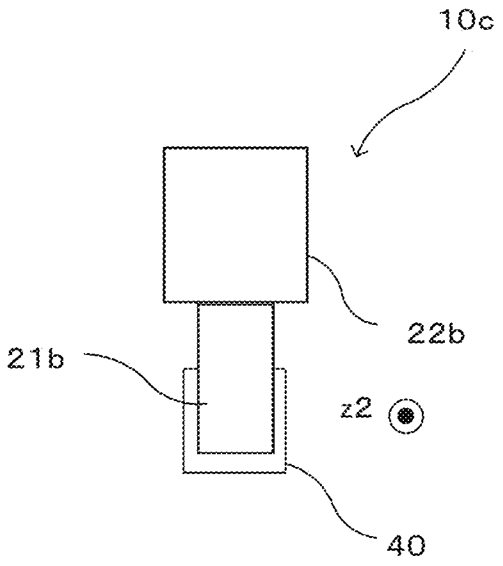
FIG. 8C is a top view illustrating the third contact.
Figure 8D:
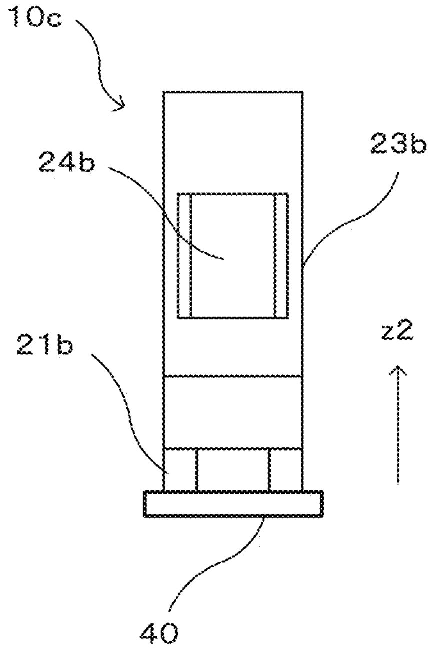
FIG. 8D is a second side view illustrating the third contact.

As illustrated in FIGS. 8A, 8B, 8C, and 8D, in one example, the third contact 10*c* is a metal member and has a bent shape that is, overall, an elongated plate-like shape. A substrate connector 21*b* is formed at a first end of the third contact 10*c*. As illustrated in FIG. 8A, the substrate connector 21*b* is soldered to the signal electrode 40 of the second substrate 2*b*.

A rising portion 22*b* of the third contact 10*c* is bent 90 degrees from the substrate connector 21*b* and extends in the +z direction. Furthermore, a second end of the third contact 10*c* bends in an upside-down U-shape from the rising portion 22*b*, and extends toward the substrate connector 21*b*. A contact contactor 23*b* is provided on this portion. A recess 24*b* into which the protrusion 24*a* of the first contact 10*a* (see FIG. 3B) fits is provided on the contact contactor 23*b*.

As illustrated in FIGS. 7A and 7B, when viewing from the z2-axis direction, the third contact 10*c* is arranged in a direction such that the longitudinal direction thereof matches the y2-axis direction. In the plug connector 1*b*, a pair of members is provided as the third contact 10*c*. One third contact 10*c* is arranged at both ends in the x2-axis direction, along the main surface of the second substrate 2*b*.

The shape of the fourth contact 10*d* is the same as the shape of the third contact 10*c* illustrated in FIGS. 8A to 8D. As with the third contact 10*c*, in the fourth contact 10*d*, the substrate connector 21*b* is soldered to the signal electrode 40 of the second substrate 2*b*. When viewing from the z2-axis direction, the fourth contact 10*d* is arranged such that the longitudinal direction thereof matches the y2-axis direction.

Figure 9:
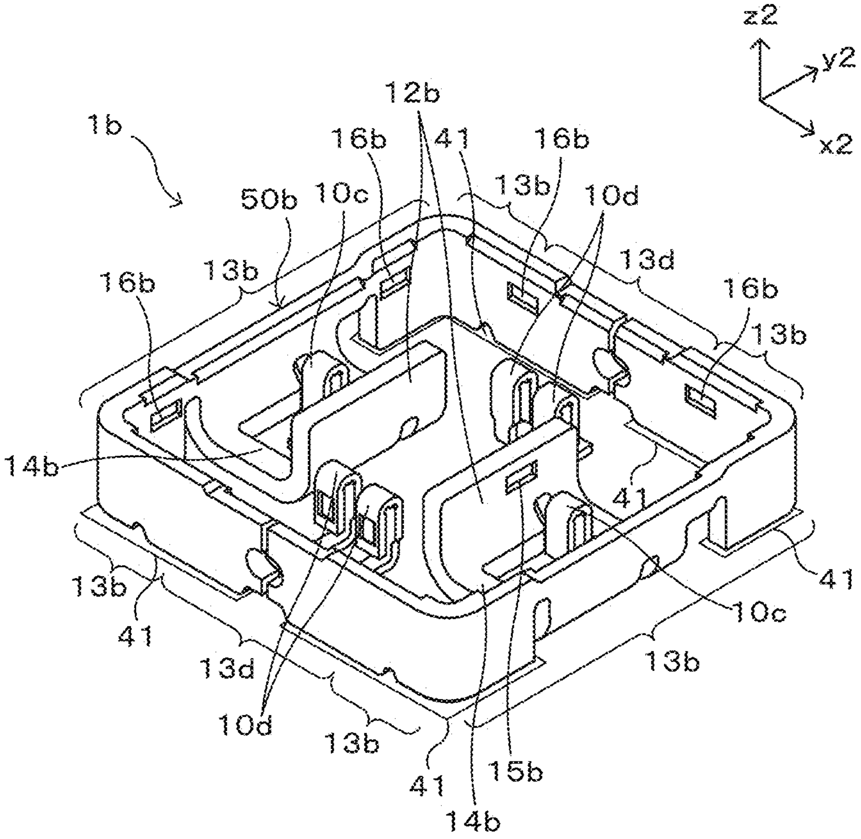
FIG. 9 is a perspective view illustrating the configuration of the receptacle connector, in which portions formed by electrically conductive members are extracted.

As illustrated in FIG. 9, in the plug connector 1*b*, four of the fourth contact 10*d* are arranged at a center portion in the x2-axis direction. In the plug connector 1*b*, the fourth contacts 10*d* form a 2×2 matrix in which two fourth contacts 10*d* are arranged in the x2-axis direction, and two fourth contact 10*d* are arranged in the y2-axis direction.

The second housing 11*b* is a member that serves as the parent body of the plug connector 1*b*, and has the x1-axis direction as the longitudinal direction. A resin, for example, is used as the material of the second housing 11*b*. The second housing 11*b* includes a back surface that faces the second substrate 2*b* and a front surface that faces the receptacle connector 1*a* when fitted together.

The second housing 11*b* is partitioned into a plurality of regions along the in-plane directions of the second substrate 2*b*, and a holder of each of the contacts is formed in each region. The second housing 11*b* includes a third holder 20*c* that holds the third contact 10*c*, and a fourth holder 20*d* that holds the fourth contact 10*d*.

In the plug connector 1*b*, a pair of the third holder 20*c* is arranged along the x2-axis direction so as to sandwich the fourth holder 20*d*. Specifically, the fourth holder 20*d* is arranged at the center in the x2-axis direction, and the third holder 20*c* is arranged at each end in the x2-axis direction.

The third contact 10*c*, the fourth contact 10*d*, and the second partition wall 12*b* are press-fit into the second housing 11*b*, and voids for holding are provided. Additionally, voids, into which the constituents of the receptacle connector 1*a* enter when fitted together with the receptacle connector 1*a*, are provided in the second housing 11*b*. Furthermore, voids, for confirming connections with the third contact 10*c*, the fourth contact 10*d*, and the signal electrode 40, are provided in the second housing 11*b*.

As illustrated in FIG. 7A, in one example, the second partition wall 12*b* is a metal member, and is held by the second housing 11*b* so as to partition the third holder 20*c* and the fourth holder 20*d*. Specifically, the second partition wall 12*b* is held by the second housing 11*b* so as to partition a portion of the boundary between the third holder 20*c* and the fourth holder 20*d* in a state insulated from the third contact 10*c* and the fourth contact 10*d* (see FIG. 10). Since the third holder 20*c* is provided at both ends in the x2-axis direction of the fourth holder 20*d*, the second partition wall 12*b* is provided at each of both ends in the x2-axis direction of the fourth holder 20*d*. The two second partition walls 12*b* each extend in the y2-axis direction and partition the third holder 20*c* and the fourth holder 20*d*.

As illustrated in FIG. 9, a stopper 15*b* is provided on the second partition wall 12*b*. The stopper 15*b* is a portion at a center portion in the y2-axis direction of the second partition wall 12*b*, and is recessed relative to the wall surface.

The plug connector 1*b* includes a second shell 50*b* that is arranged so as to, when viewed from the z2-axis direction, surround the second housing 11*b*, the third contact 10*c*, and the fourth contact 10*d* on four sides. In one example, the second shell 50*b* is a metal member, and the second outer wall 13*b* and the fourth outer wall 13*d* are portions of the second shell 50*b*. The second shell 50*b* has a size that contacts an outer peripheral portion of the first shell 50*a* of the receptacle connector 1*a*. The second shell 50*b* is held by the third holder 20*c* in a state insulated from the third contact 10*c*, and is held by the fourth holder 20*d* in a state insulated from the fourth contact 10*d*. In the present embodiment, the second shell 50*b* corresponds to a second periphery surrounding wall.

The second outer wall 13*b* is a portion of the second shell 50*b* that, when viewed from the direction of the line normal to the main surface of the second substrate 2*b*, surrounds the third holder 20*c* together with the second partition wall 12*b*. More specifically, as illustrated in FIGS. 7A and 7B, the second outer wall 13*b* includes an opposing wall that opposes the second partition wall 12*b*, and side walls that respectively extend from each end of the opposing wall toward the second partition wall 12*d*. The third contact 10*c* is surrounded by the opposing wall and the side walls, and the second partition wall 12*b*.

Figure 10:
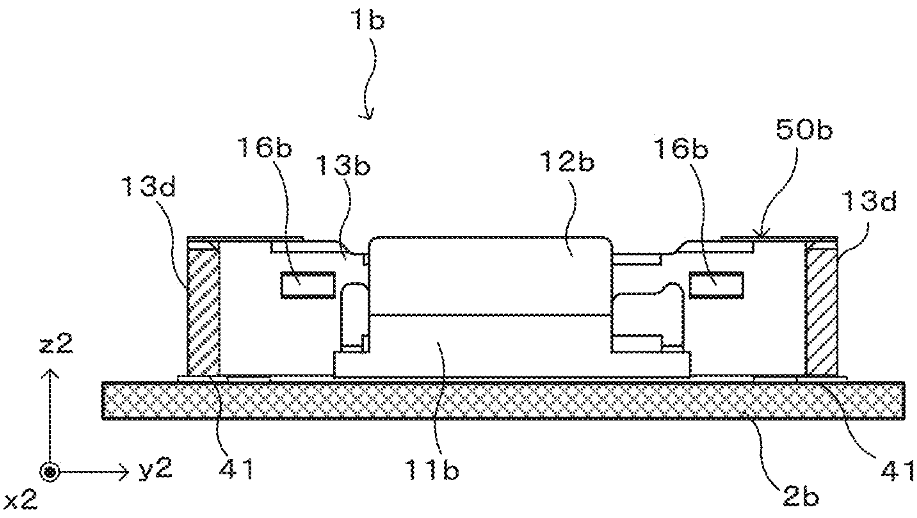
FIG. 10 is a cross-sectional view taken along line B-B of FIG. 7A.

As illustrated in FIG. 10, the second outer wall 13*b* is connected to the ground electrode 41 of the second substrate 2*b*. That is, the second outer wall 13*b* is grounded to the second substrate 2*b*. Additionally, as illustrated in FIGS. 7A and 7B, when viewed from the z2-axis direction, the second outer wall 13*b* is arranged outward from an outer shape that includes the end of the substrate connector 21*a* of the third contact 10*c*. In the present embodiment, the entire third contact 10*c* is surrounded by ground members.

As illustrated in FIGS. 7A and 7B, the second shell 50*b* includes an electrically conductive second coupler 14*b* that couples the second partition wall 12*b* and the second outer wall 13*b*. The second coupler 14*b* is a plate-like member that intersects the line normal to the main surface of the second substrate 2*b* (the z2-axis direction). Since the second coupler 14*b* contacts the second substrate 2*b*, a recess is formed, by the second partition wall 12*b*, the second outer wall 13*b*, and the second coupler 14*b*, that surrounds the third contact 10*c*. When the plug connector 1*b* and the receptacle connector 1*a* are fitted together, the annular protrusion, formed by the first partition wall 12*a*, the first outer wall 13*a*, and the first coupler 14*a* of the receptacle connector 1*a*, is fitted into this recess.

As illustrated in FIGS. 7A and 7B, when viewing from the z2-axis direction, the fourth outer wall 13*d* is integrated with the second outer wall 13*b*, and surrounds the second housing 11*b* on four sides. The fourth outer wall 13*d* is a portion that, when viewed from the z2-axis direction, surrounds the fourth holder 20*d* of the second housing 11*b* together with the second partition wall 12*b*. Note that the fourth outer wall 13*d* can be regarded as an electrically conductive member that connects a pair of the second outer walls 13*b* to each other.

As illustrated in FIG. 9, a stopper 16*b* is provided on the second outer wall 13*b*. The stopper 16*b* is recessed relative to the wall main body, and is provided at two locations of the opposing wall, and one location on each of the side walls. Note that the stopper 16*b* may be provided on the fourth outer wall 13*d*.

Figure 11:
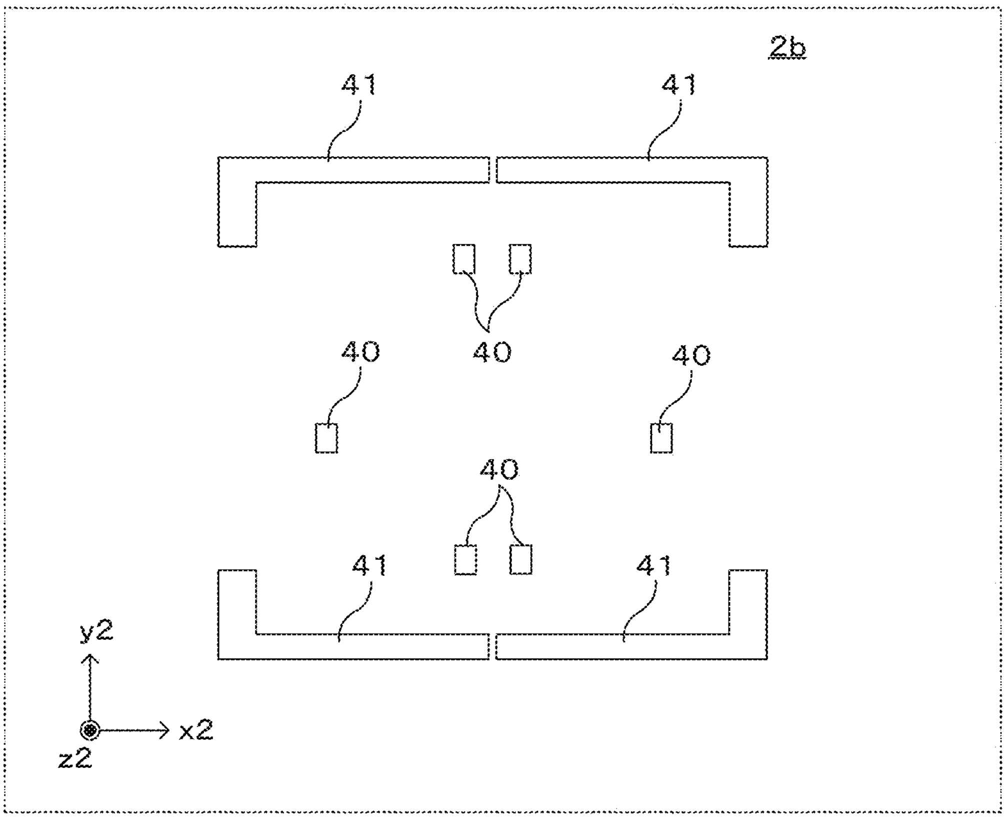
FIG. 11 is a drawing illustrating the arrangement of the signal electrode and the ground electrode on a second substrate.

As illustrated in FIG. 11, the signal electrode 40 and the ground electrode 41 are provided on the second substrate 2*b*. Arrangement locations of the signal electrode 40 correspond to arrangement locations of the third contact 10*c* and the fourth contact 10*d*, and arrangement locations of the ground electrode 41 correspond to arrangement locations of the second partition wall 12*b*, the second outer wall 13*b*, and the fourth outer wall 13*d*.

As illustrated in FIG. 9, in the plug connector 1*b*, the third contact 10*c* and the fourth contact 10*d* are partitioned by the second partition wall 12*b*. Additionally, the third contact 10*c* is surrounded on four sides by the second outer wall 13*b* and the second partition wall 12*b*, and the fourth contact 10*d* is surrounded on four sides by the fourth outer wall 13*d* and the second partition wall 12*b*. As illustrated in FIGS. 9 and 10, in the plug connector 1*b*, the second partition wall 12*b* is arranged such that third contact 10*c* cannot be seen from the fourth contact 10*d*. In particular, the second partition wall 12*b* is arranged such that the substrate connector 21*a* of the third contact 10*c* cannot be seen from the substrate connector 21*a* of the fourth contact 10*d*.

Next, the operations of the electrical connector pair 1 according to some embodiments of the present disclosure are described. Note that the first substrate 2*a* and the second substrate 2*b* are omitted in FIGS. 12, 13, 14, and 15 that illustrate the operations.

Figure 12:
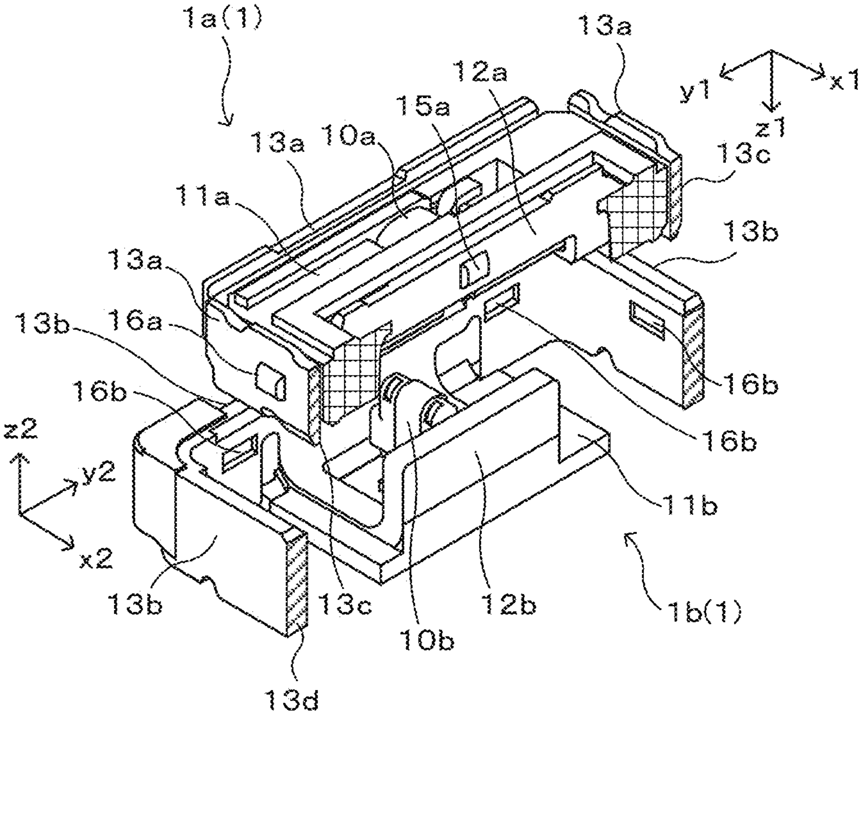
FIG. 12 is perspective cross-sectional view taken along line A-A and line B-B, immediately before fitting the receptacle connector and the plug connector together.
Figure 13:
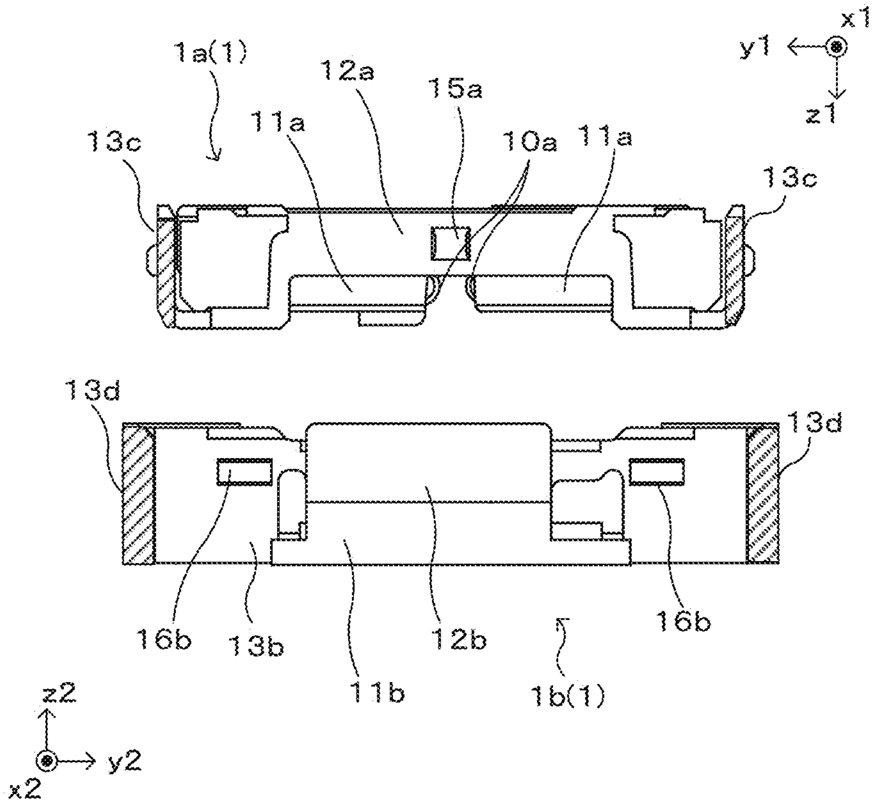
FIG. 13 is cross-sectional view taken along line A-A and line B-B, immediately before fitting the receptacle connector and the plug connector together.

Firstly, as illustrated in FIGS. 12 and 13, the receptacle connector 1*a* and the plug connector 1*b* are made to face each other such that the +z1-axis direction and the +z2-axis direction are opposite directions. Furthermore, provided that the first shell 50*a* is configured to be accommodated in the inner periphery of the second shell 50*b*, the positions of the annular (frame-like) protrusion formed by the first partition wall 12*a*, the first outer wall 13*a*, and the first coupler 14*a*, and the recess formed by the second outer wall 13*b* and the second coupler 14*b* match. Guiding by the protrusion and the recess makes it possible to fit the plug connector 1*b* and the receptacle connector 1*a* together. As a result, the stopper 16*a* and the stopper 16*b* engage. Additionally, the elastic contactor 18*c* presses against and contacts the second outer wall 13*b*, and the elastic contactor 18*d* presses against and contacts the fourth outer wall 13*d*.

Figure 14:
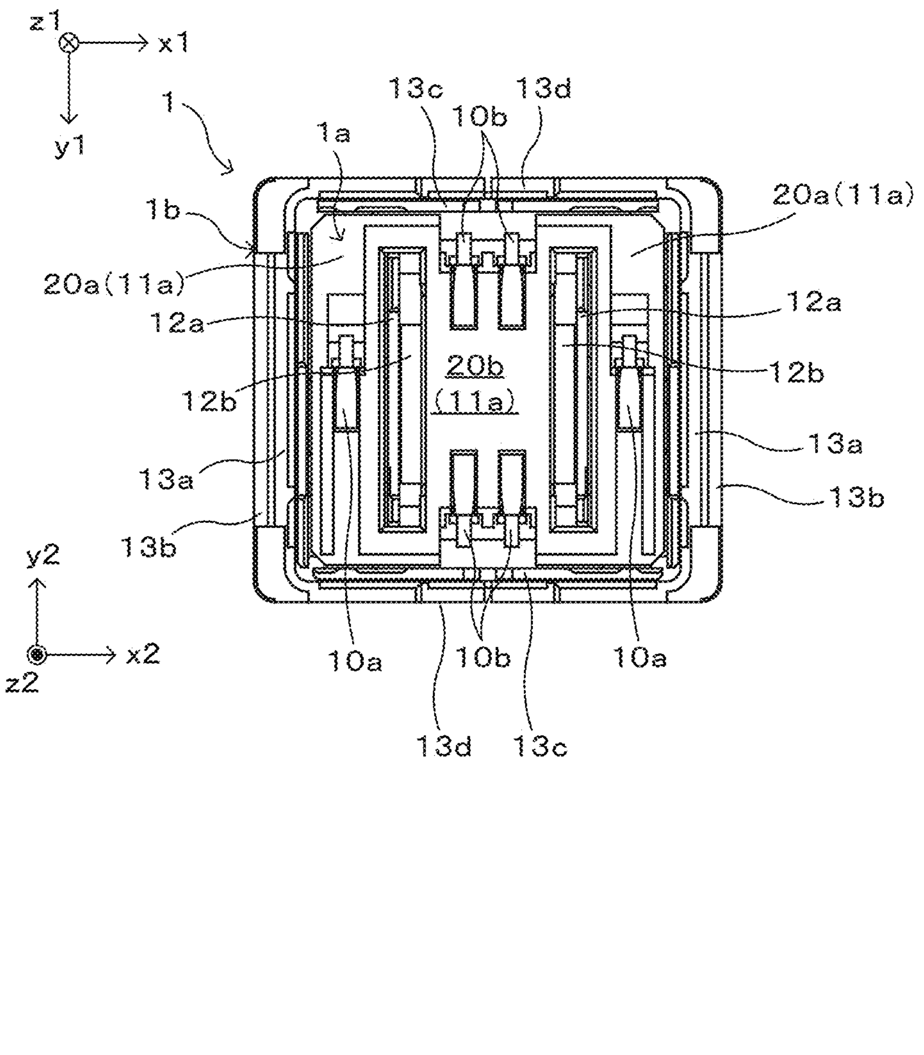
FIG. 14 is drawing of when the receptacle connector and the plug connector are fitted together.
Figure 15:
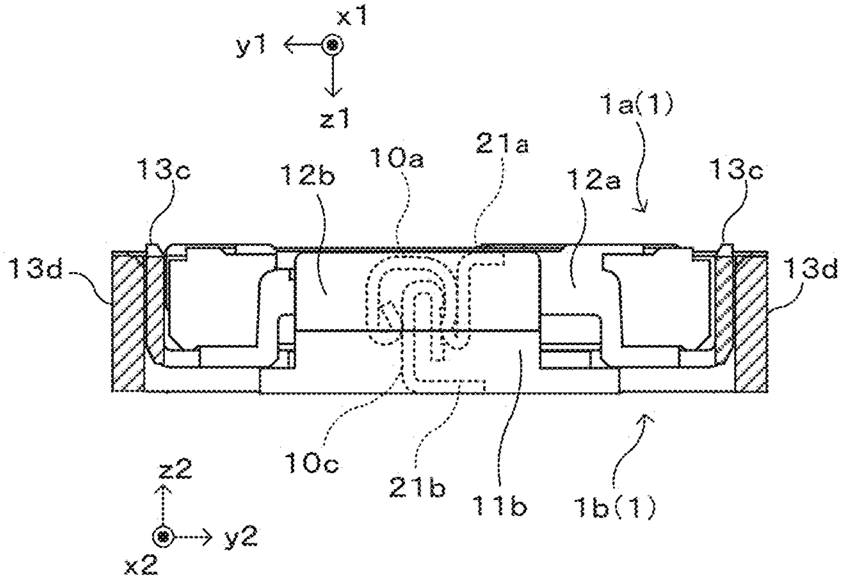
FIG. 15 is a side view of when the receptacle connector and the plug connector are fitted together.
Figure 16:
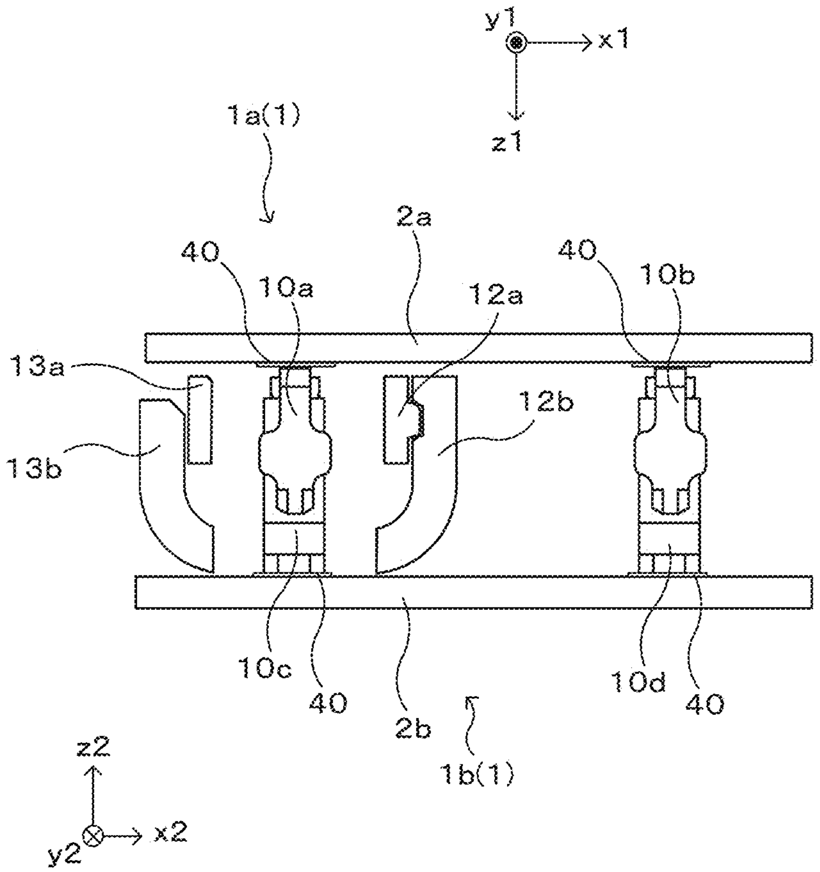
FIG. 16 is a schematic view illustrating the surroundings of first contact and the third contact, in a state in which the first contact and the third contact are fitted together.

When the receptacle connector 1*a* and the plug connector 1*b* are fitted together as illustrated in FIGS. 14, 15, and 16, the first contact 10*a* and the third contact 10*c* contact as illustrated in FIG. 15. As a result, as illustrated in FIG. 16, a signal transmission path, specifically, the signal electrode 40 of the first substrate 2*a*→the first contact 10*a*→the third contact 10*c*→the signal electrode 40 of the second substrate 2*b* is formed.

Additionally, when the receptacle connector 1*a* and the plug connector 1*b* are fitted together, as with the first contact 10*a* and the third contact 10*c*, the second contact 10*b* and the fourth contact 10*d* contact. As a result, a signal transmission path, specifically, the signal electrode 40 of the first substrate 2*a*→the second contact 10*b*→the fourth contact 10*d*→the signal electrode 40 of the second substrate 2*b* is formed.

Furthermore, when the receptacle connector 1*a* and the plug connector 1*b* are fitted together, as illustrated in FIG. 14, the first partition wall 12*a* and the second partition wall 12*b* become adjacent in the x1-axis direction, and assume a contacting state. In this case, as illustrated in FIG. 14, the second contact 10*b* and the fourth contact 10*d*, and the first contact 10*a* and the third contact 10*c* are partitioned by the first partition wall 12*a* and the second partition wall 12*b*. Additionally, as illustrated in FIGS. 15 and 16, due to the first partition wall 12*a* and the second partition wall 12*b*, the first contact 10*a* and the third contact 10*c* cannot be seen from the second contact 10*b* and the fourth contact 10*d*. Specifically, when the receptacle connector 1*a* and the plug connector 1*b* are fitted together, the first partition wall 12*a* partitions a portion of the boundary between the third holder 20*c* and the fourth holder 20*d* where the second partition wall 12*b* is not formed such that the first contact 10*a* and the third contact 10*c* cannot be seen from the second contact 10*b* and the fourth contact 10*d*. As a result, electromagnetic noise that is introduced to the second contact 10*b* and the fourth contact 10*d* from the first contact 10*a* and the third contact 10*c* can be reduced and, furthermore, leakage of electromagnetic noise from the second contact 10*b* and the fourth contact 10*d* to the first contact 10*a* and the third contact 10*c* can be further reduced.

More specifically, the second partition wall 12*b* is arranged so as to overlap the first partition wall 12*a* when viewing from the first contact 10*a* and the third contact 10*c*. That is, as illustrated in FIG. 14, when viewing from the first contact 10*a* and the third contact 10*c*, the first outer wall 13*a* and the second outer wall 13*b* are arranged doubly. Due to this configuration, the electromagnetic noise component that is introduced to the second contact 10*b* and the fourth contact 10*d* from the first contact 10*a* and the third contact 10*c* can be further reduced, and the electromagnetic noise component that is introduced to the first contact 10*a* and the third contact 10*c* from the second contact 10*b* and the fourth contact 10*d* can be further reduced.

Note that, when the receptacle connector 1*a* and the plug connector 1*b* are fitted together, the stopper 15*a* of the first partition wall 12*a* and the stopper 15*b* of the second partition wall 12*b* engage, and the stopper 16*a* of the first outer wall 13*a* and the stopper 16*b* of the second outer wall 13*b* engage. As a result, the fitting force between the receptacle connector 1*a* and the plug connector 1*b* can be increased. Moreover, since the first outer wall 13*a* and the second outer wall 13*b* conduct, these components are more likely to trap electromagnetic noise.

When the receptacle connector 1*a* and the plug connector 1*b* are fitted together, as illustrated in FIG. 14, when viewing from the second contact 10*b* and the fourth contact 10*d*, the third outer wall 13*c* and the fourth outer wall 13*d* are arranged doubly. Due to this configuration, the electromagnetic noise component that is introduced to the second contact 10*b* and the fourth contact 10*d* from outside can be further reduced, and the electromagnetic noise component emitted outside from the second contact 10*b* and the fourth contact 10*d* can be further reduced.

Embodiment 2

Figure 17:
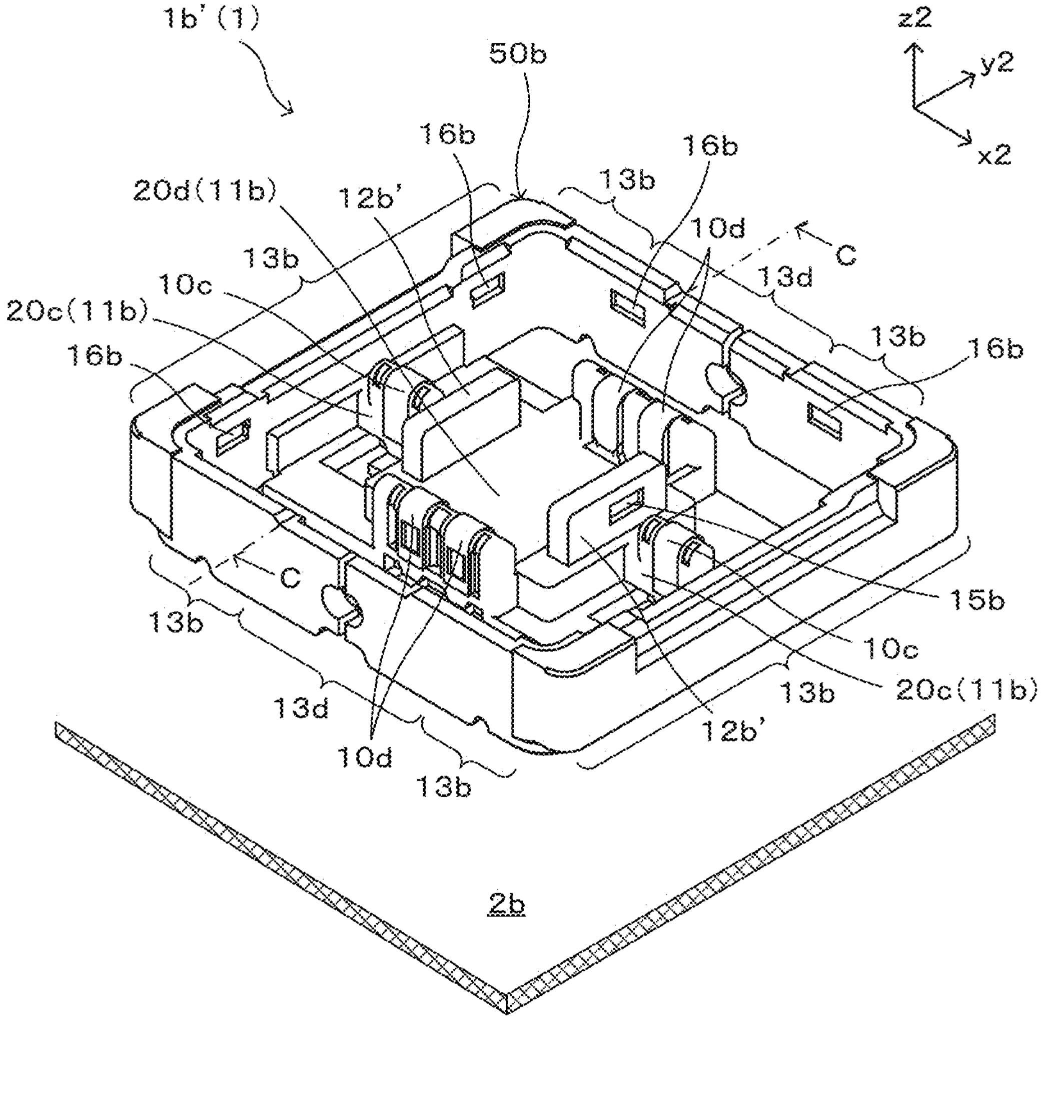
FIG. 17 is a perspective view illustrating the configuration of a plug connector of an electrical connector pair according to Embodiment 2 of the present disclosure.

Next, Embodiment 2 of the present disclosure is described. An electrical connector pair 1 according to the present embodiment is the same as the electrical connector pair 1 of Embodiment 1 in that it includes a receptacle connector 1*a* and a plug connector 1*b*. As illustrated in FIG. 17, a plug connector 1*b*' includes, in place of the second partition wall 12*b*, a second partition wall 12*b*' that is an electrically conductive member.

Figure 18:
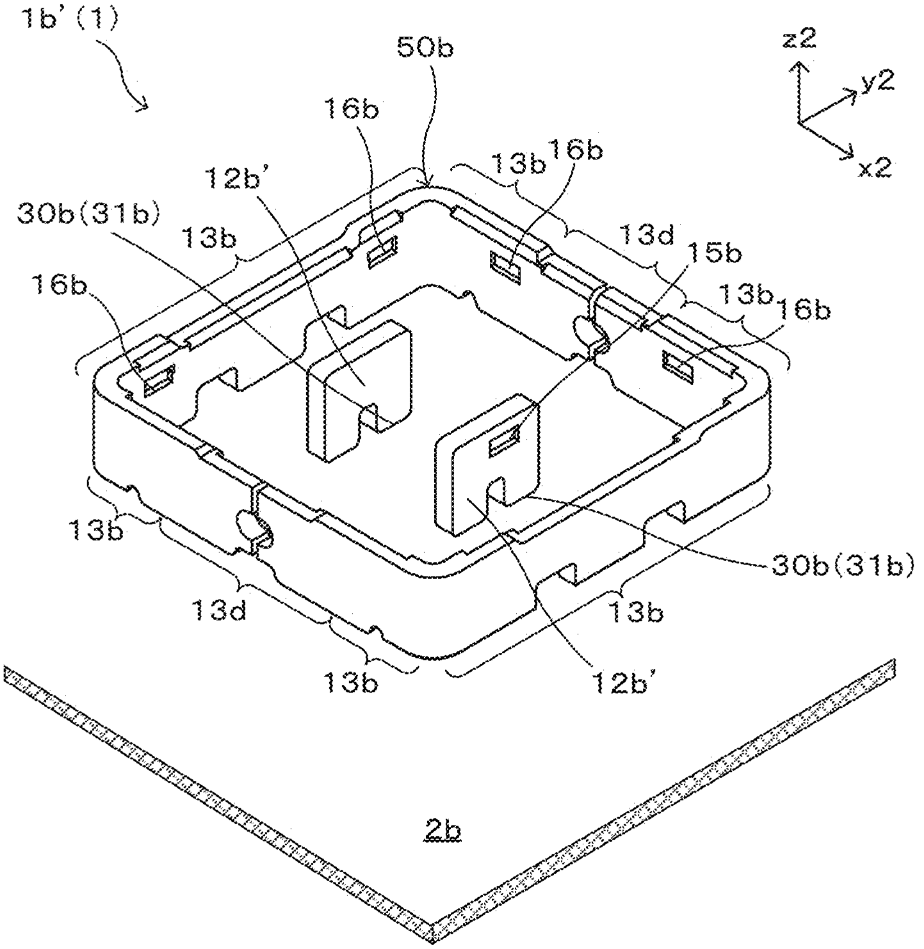
FIG. 18 is a perspective view of portions of the plug connector of FIG. 17 that are formed by electrically conductive members.

As with the second partition wall 12*b*, the second partition wall 12*b*' is held by the second housing 11*b* so as to partition the third holder 20*c* and the fourth holder 20*d*. However, as illustrated in FIG. 18, the second partition wall 12*b*' is not coupled to the second outer wall 13*b*. In the present embodiment, the second partition wall 12*b*' does not need to be coupled to the second partition wall 13*b* or the fourth outer wall 13*d*. Specifically, the second partition wall 12*b*' is held by the second housing 11*b* so as to partition a portion of the boundary between the third holder 20*c* and the fourth holder 20*d* in a state insulated from the third contact 10*c* and the fourth contact 10*d*.

As illustrated in FIG. 18, the second partition wall 12*b*' includes a second end 30*b* that contacts the second substrate 2*b*. A second ground connector 31*b* that connects to the ground electrode 41 of the second substrate 2*b* is provided on the second end 30*b*.

Figure 19:
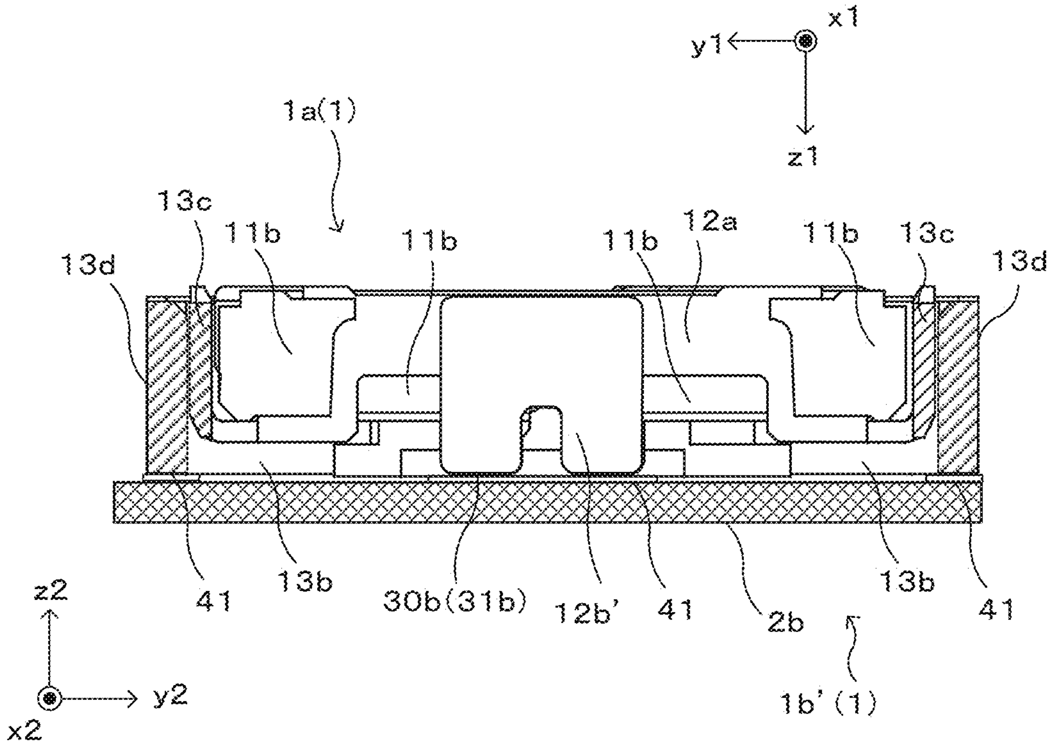
FIG. 19 is a cross-sectional view taken along line C-C of FIG. 17, of when the receptacle connector and the plug connector are fitted together.

As illustrated in FIGS. 17 and 19, due to the first partition wall 12*a* and the second partition wall 12*b*', the first contact 10*a* and the third contact 10*c* cannot be seen from the second contact 10*b* and the fourth contact 10*d*. Specifically, when the receptacle connector 1*a* and the plug connector 1*b*' are fitted together, the first partition wall 12*a* partitions a portion of the boundary between the third holder 20*c* and the fourth holder 20*d* where the second partition wall 12*b*' is not formed such that the first contact 10*a* and the third contact 10*c* cannot be seen from the second contact 10*b* and the fourth contact 10*d*. As a result, electromagnetic noise that is introduced to the second contact 10*b* and the fourth contact 10*d* from the first contact 10*a* and the third contact 10*c* can be reduced and, furthermore, leakage of electromagnetic noise from the second contact 10*b* and the fourth contact 10*d* to the first contact 10*a* and the third contact 10*c* can be further reduced.

Embodiment 3

Figure 20:
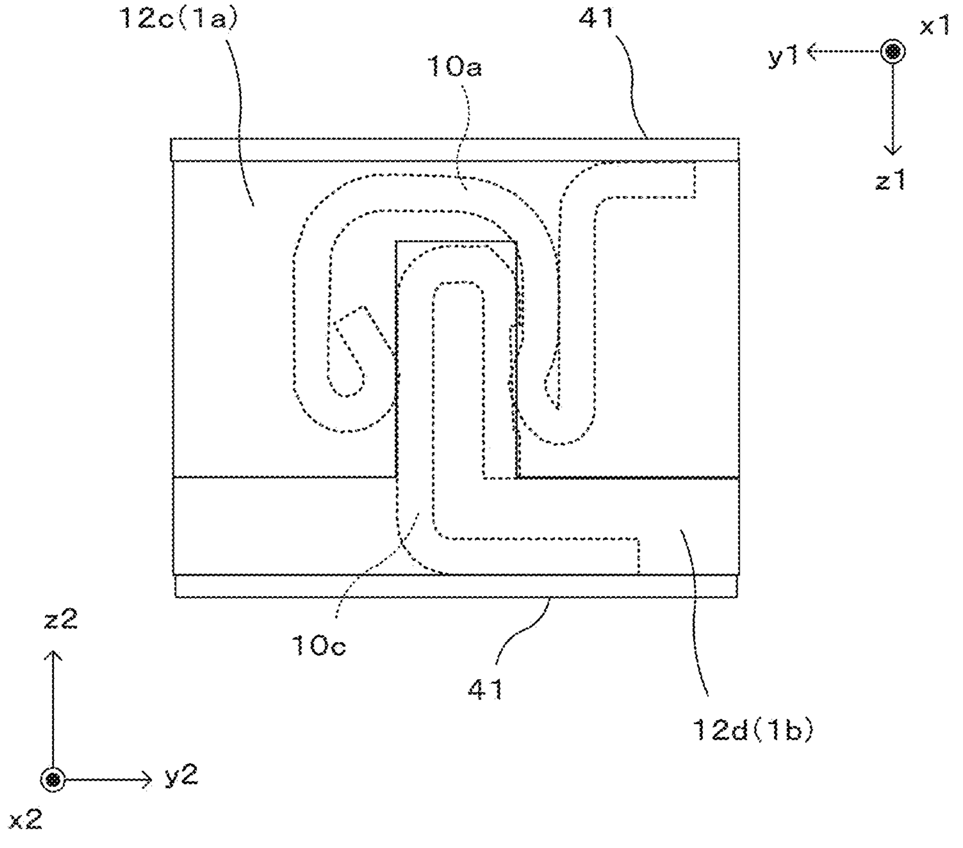
FIG. 20 is a schematic drawing illustrating a modified example of a first partition wall and a second partition wall of an electrical connector pair according to Embodiment 3 of the present disclosure.

Next, Embodiment 3 of the present disclosure is described. An electrical connector pair 1 according to the present embodiment is the same as the electrical connector pair 1 of Embodiments 1 and 2 in that it includes a receptacle connector 1*a* and a plug connector 1*b*. As illustrated in FIG. 20, in the present embodiment, the receptacle connector 1*a* includes, in place of the first partition wall 12*a*, a first partition wall 12*c*, and the plug connector 1*b* includes, in place of the second partition wall 12*b*, a second partition wall 12*d*.

As illustrated in FIG. 20, in the receptacle connector 1*a*, when viewing from the x1-axis side, a center portion in the y1-axis direction of the first partition wall 12*c* is notched. Additionally, in the plug connector 1*b*, when viewing from the x2-axis side, a center portion in the y2-axis direction of the second partition wall 12*d* is protruding.

When the receptacle connector 1*a* and the plug connector 1*b* are fitted together, the first partition wall 12*c* and the second partition wall 12*d* fit together to form a single partition wall extending in the y1- and y2-axis directions. Due to this configuration, the first partition wall 12*c* and the second partition wall 12*d* can prevent the electromagnetic noise generated by the second contact 10*b* and the fourth contact 10*d* from being introduced to the first contact 10*a* and the third contact 10*c*, and vice-versa.

As with the first partition wall 12*a* according to the embodiments described above, in the present embodiment, the first partition wall 12*c* may or may not be coupled to the first outer wall 13*a*. As with the second partition wall 12*b* according to the embodiments described above, the second partition wall 12*d* may be coupled to the second outer wall 13*b* or, as with the second partition wall 12*b*', may not be coupled to the second outer wall 13*b*.

Additionally, the first partition wall 12*c* is provided such that the first contact 10*a* cannot be seen from the second contact 10*b*, and the second partition wall 12*d* is provided such that the third contact 10*c* cannot be seen from the fourth contact 10*d*. A single partition wall can be formed by fitting the first partition wall 12*c* and the second partition wall 12*d* together.

Embodiment 4

Figure 21A:
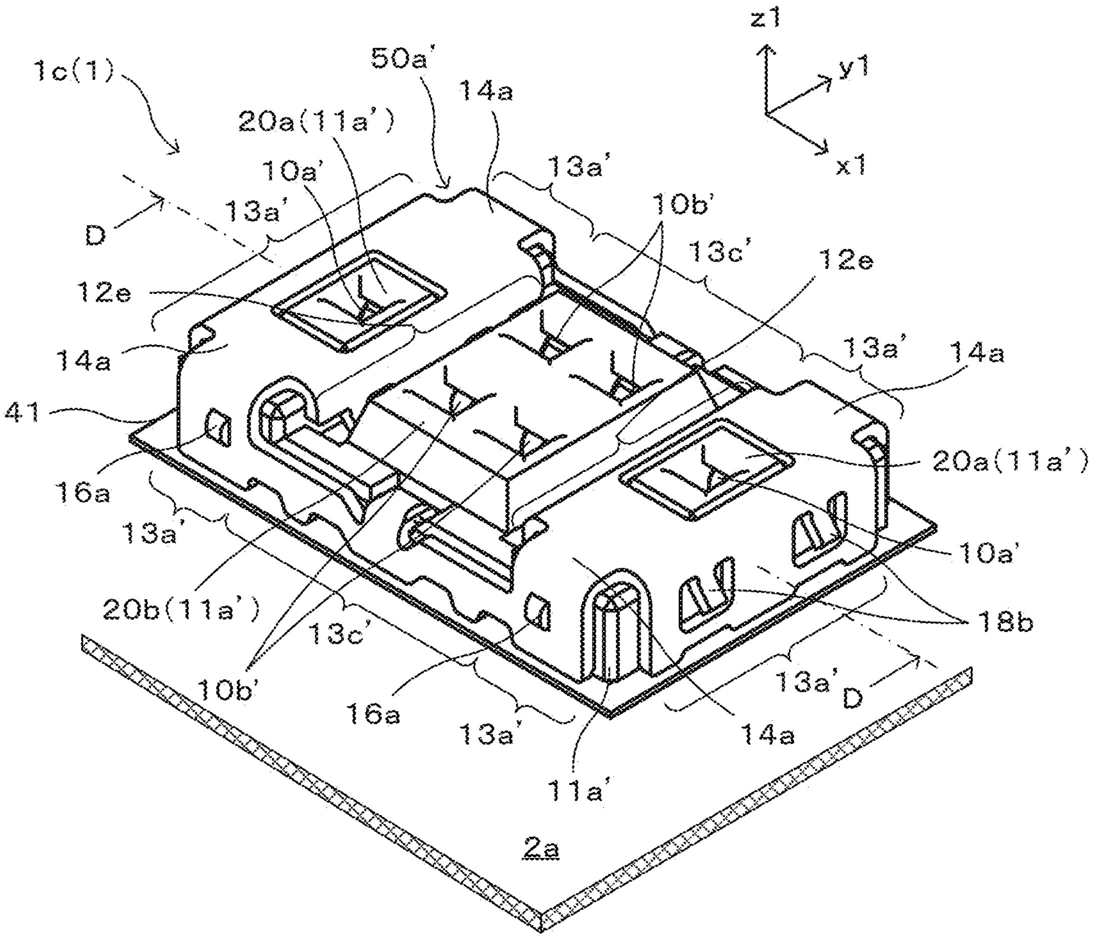
FIG. 21A is a perspective view illustrating the configuration of a receptacle connector of an electrical connector pair according to Embodiment 4 of the present disclosure.
Figure 21B:
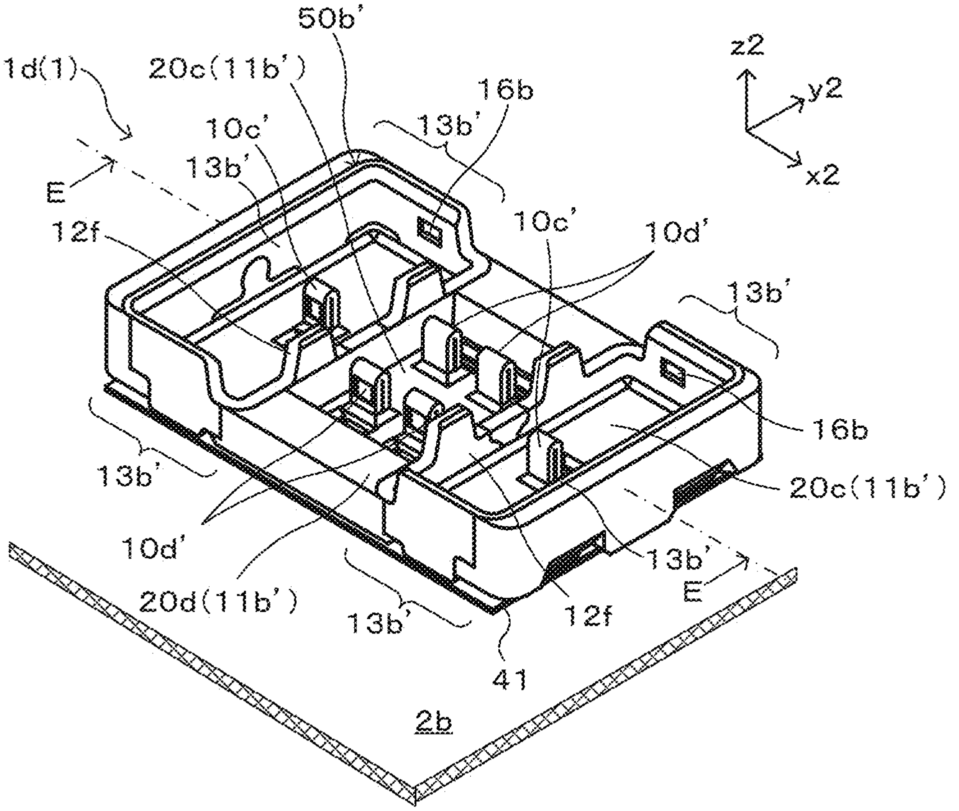
FIG. 21B is a perspective view illustrating the configuration of a plug connector of the electrical connector pair according to Embodiment 4 of the present disclosure.

Next, Embodiment 4 of the present disclosure is described. As illustrated in FIGS. 21A and 21B, an electrical connector pair 1 according to the present embodiment includes a receptacle connector 1*c* as a first connector, and a plug connector 1*d* as a second connector. The receptacle connector 1*c* is mounted on a main surface of a first substrate 2*a*, and the plug connector 1*d* is mounted on a main surface of a second substrate 2*b*.

Receptacle Connector

As illustrated in FIG. 21A, the receptacle connector 1*c* includes a first contact 10*a*' that is an electrically conductive member, a second contact 10*b*' that is an electrically conductive member, a first housing 11*a*' that is an insulating member, a first partition wall 12*e* that is an electrically conductive member, a first outer wall 13*a*' that is an electrically conductive member, and a third outer wall 13*c*' that is an electrically conductive member.

Figure 22A:
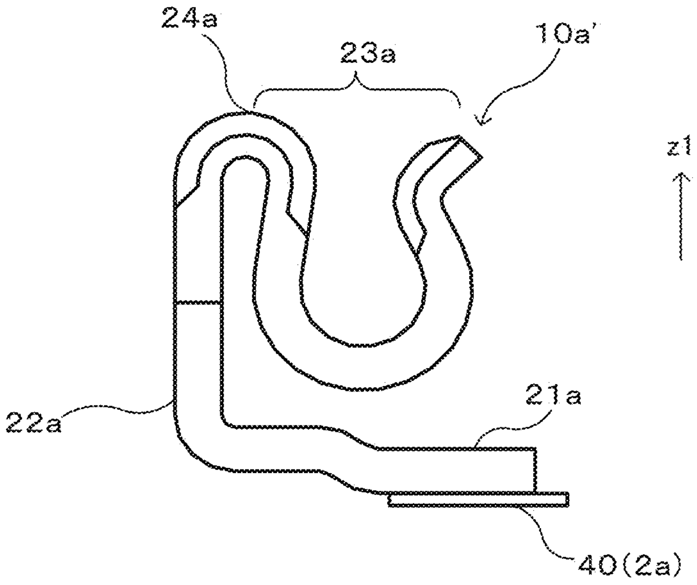
FIG. 22A is a side view illustrating a first contact.
Figure 23A:
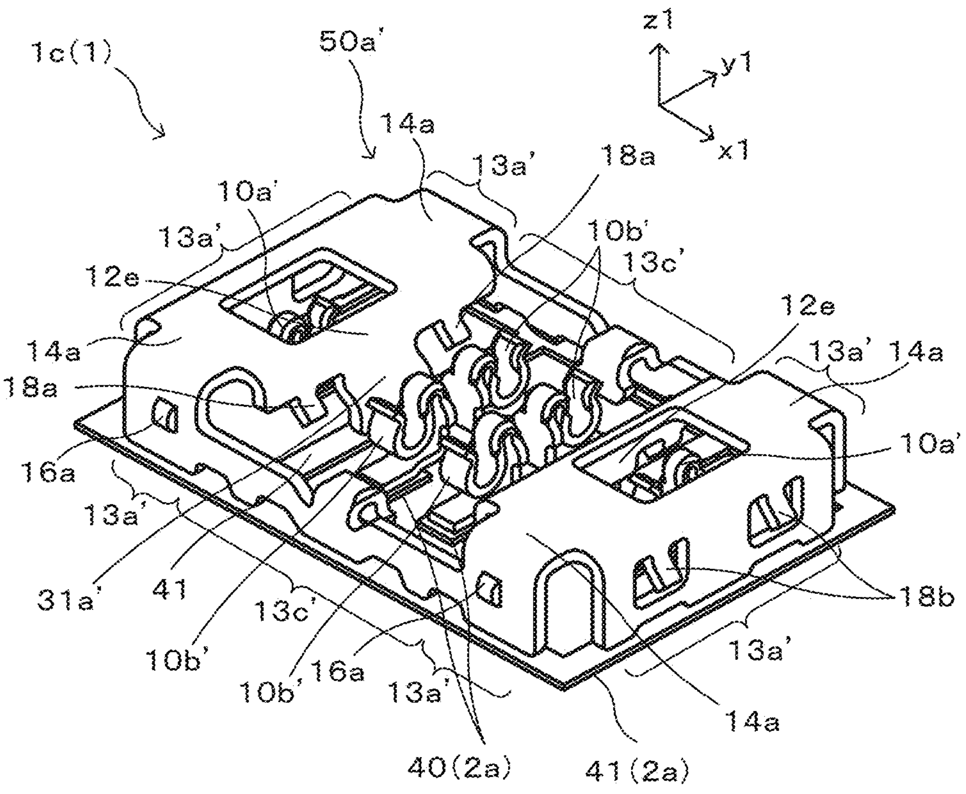
FIG. 23A is a perspective view illustrating the configuration of the receptacle connector in which portions formed by electrically conductive members are extracted.

As illustrated in FIG. 22A, the configuration of the first contact 10*a*' is the same as the configuration of the first contact 10*a* (FIG. 3A) in that it includes a substrate connector 21*a*, a rising portion 22*a*, a contact contactor 23*a*, and a protrusion 24*a*. However, in the first contact 10*a*', the direction in which the substrate connector 21*a* extends with respect to the rising portion 22*a* is opposite that of the first contact 10*a*. As illustrated in FIG. 23A, one first contact 10*a*' is arranged at both ends in the x1-axis direction, along the main surface of the first substrate 2*a*.

The configuration of the second contact 10*b*' is the same as the configuration of the first contact 10*a*'. When viewing from the z1-axis direction, the second contact 10*b*' is arranged such that the longitudinal direction thereof matches the y1-axis direction. The arrangement of the second contact 10*b*' is the same as the arrangement of the second contact 10*b* described above (see FIG. 4).

As illustrated in FIG. 21A, the first housing 11*a*' includes a first holder 20*a* that holds the first contact 10*a*', and a second holder 20*b* that holds the second contact 10*b*'. The second holder 20*b* is arranged at the center in the x1-axis direction, and the first holder 20*a* is arranged at each end in the x1-axis direction.

The first partition wall 12*e* is held by the first housing 11*a*' so as to partition the first holder 20*a* and the second holder 20*b*. Since the first holder 20*a* is provided at both ends in the x1-axis direction of the second holder 20*b*, the first partition wall 12*e* is provided at each of both ends in the x1-axis direction of the second holder 20*b*. The two first partition walls 12*e* each extend in the y1-axis direction and partition the first holder 20*a* and the second holder 20*b*.

As illustrated in FIG. 23A, an elastic contactor 18*a* is provided on the first partition wall 12*e*. The elastic contactor 18*a* is a plate-like member, and projects in a bent manner from the main body of the first partition wall 12*e*.

The receptacle connector 1*c* includes a first shell 50*a*' that, when viewing from the z1-axis direction, surrounds the first housing 11*a*' on four sides. In one example, the first shell 50*a*' is a metal member, and the first outer wall 13*a*' and the third outer wall 13*c*' are portions of the first shell 50*a'*.

As illustrated in FIG. 21A, the first outer wall 13*a*' is a portion of the first shell 50*a*' that, when viewed from the z1-axis direction, surrounds the first holder 20*a* together with the first partition wall 12*e*. More specifically, the first outer wall 13*a*' includes an opposing wall that opposes the first partition wall 12*e*, and side walls that respectively extend from each end of the opposing wall toward the third outer wall 13*c*'. The first contact 10*a*' is surrounded by the opposing wall and the side walls, and the first partition wall 12*e*.

As illustrated in FIG. 23A, the first outer wall 13*a*' includes a first ground connector 31*a*' that is connected to the ground electrode 41 of the first substrate 2*a*. That is, the first outer wall 13*a*' is grounded to the first substrate 2*a*.

As illustrated in FIG. 23A, the first shell 50*a*' includes an electrically conductive first coupler 14*a* that couples the first partition wall 12*e* and the first outer wall 13*a*'. The first coupler 14*a* is a plate-like member that intersects the line normal to the main surface of the first substrate 2*a* (straight line in the z1-axis direction). The first coupler 14*a* couples the first partition wall 12*e* and the first outer wall 13*a*' on the side far from the first substrate 2*a*. Due to this, an annular (frame-like) protrusion is formed, by the first partition wall 12*e*, the first outer wall 13*a*', and the first coupler 14*a*, that surrounds the first contact 10*a*'. This annular protrusion functions as an electromagnetic shielding member between the first contact 10*a*' and outside.

As illustrated in FIG. 21A, when viewing from the z1-axis direction, the third outer wall 13*c*' is integrated with the first outer wall 13*a*', and surrounds the first housing 11*a*' on four sides. The third outer wall 13*c*' is a portion that, when viewed from the z1-axis direction, surrounds the second holder 20*b* of the first housing 11*a* together with the first partition wall 12*e*. Note that the third outer wall 13*c*' can be regarded as an electrically conductive member that connects a pair of the first outer walls 13*a*' to each other.

As illustrated in FIGS. 21A and 23A, a stopper 16*a* is provided on the first outer wall 13*a*'. The stopper 16*a* projects convexly from the wall main body, and is provided at one location on each of the side walls. Note that the stopper 16*a* may be provided on the third outer wall 13*c*'. Additionally, an elastic contactor 18*b* is provided on the first outer wall 13*a*'. The elastic contactor 18*b* is a portion that protrudes in a plate-like manner, and extends in a direction away from the main body of the first outer wall 13*a*.

As illustrated in FIG. 23A, in the receptacle connector 1*c*, the first contact 10*a*' and the second contact 10*b*' are partitioned by the first partition wall 12*e*. Additionally, the first contact 10*a*' is surrounded on four sides by the first outer wall 13*a*' and the first partition wall 12*e*, and the second contact 10*b*' is surrounded on four sides by the third outer wall 13*c*' and the first partition wall 12*e*. In the receptacle connector 1*c*, the first partition wall 12*e* is arranged such that a large portion of the first contact 10*a*' cannot be seen from the second contact 10*b'*.

Plug Connector

Next, the configuration of the plug connector 1*d* is described. As illustrated in FIG. 21B, the plug connector 1*d* includes a third contact 10*c*' that is an electrically conductive member, a fourth contact 10*d*' that is an electrically conductive member, a second housing 11*b*' that is an insulating member, a second partition wall 12*f* that is an electrically conductive member, and a second outer wall 13*b*' that is an electrically conductive member.

Figure 22B:
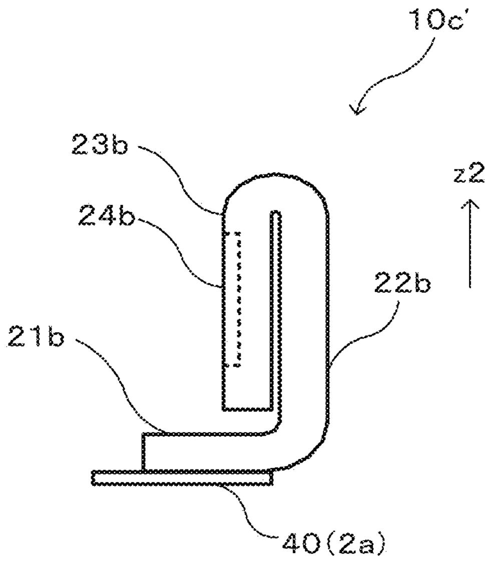
FIG. 22B is a side view illustrating a second contact.
Figure 23B:
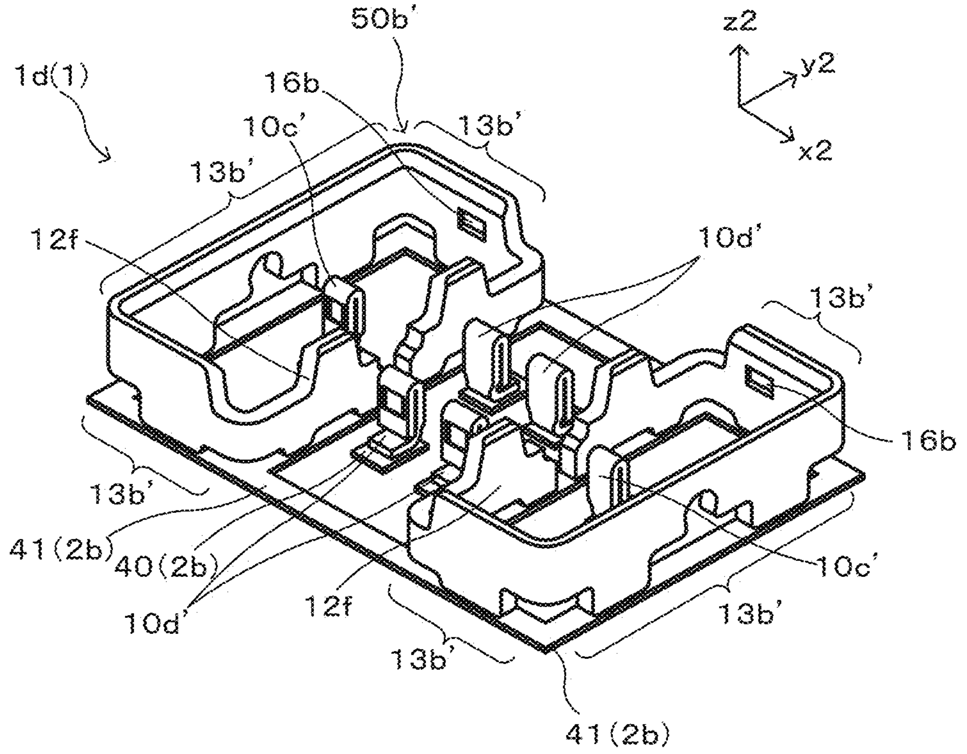
FIG. 23B is a perspective view illustrating the configuration of the plug connector, in which portions formed by electrically conductive members are extracted.

As illustrated in FIG. 22B, the configuration of the third contact 10*c*' is the same as the configuration of the third contact 10*c* (FIG. 8B) in that it includes a substrate connector 21*b*, a rising portion 22*b*, a contact contactor 23*b*, and a recess 24*b*. As illustrated in FIG. 23B, one third contact 10*c*' is arranged at both ends in the x2-axis direction, along the main surface of the second substrate 2*b* (see FIG. 21B).

The configuration of the fourth contact 10*d*' is the same as the configuration of the third contact 10*c*'. When viewing from the z2-axis direction, the fourth contact 10*d*' is arranged such that the longitudinal direction thereof matches the y2-axis direction. The arrangement of the fourth contact 10*d*' is the same as the arrangement of the fourth contact 10*d* described above (see FIG. 9).

As illustrated in FIG. 21B, the second housing 11*b*' includes a third holder 20*c* that holds the third contact 10*c*', and a fourth holder 20*d* that holds the fourth contact 10*d*'. The fourth holder 20*d* is arranged at the center in the x2-axis direction, and the third holder 20*c* is arranged at each end in that x2-axis direction.

The second partition wall 12*f* is held by the second housing 11*b*' so as to partition the third holder 20*c* and the fourth holder 20*d*. Since the third holder 20*c* is provided at both ends in the x2-axis direction of the fourth holder 20*d*, the second partition wall 12*f* is provided at each of both ends in the x2-axis direction of the fourth holder 20*d*. The two second partition walls 12*f* each extend in the y2-axis direction and partition the third holder 20*c* and the fourth holder 20*d*.

The plug connector 1*d* includes a second shell 50*b*' that is a metal member and that, when viewing from the z2-axis direction, surrounds the second housing 11*b* on four sides. The second outer wall 13*b*' is a portion of the second shell 50*b*'. The second shell 50*b*' has a size that contacts an outer peripheral portion of the first shell 50*a*' of the receptacle connector 1*c*.

The second outer wall 13*b*' is a portion of the second shell 50*b*' that, when viewed from the direction of the line normal to the main surface of the second substrate 2*b*, surrounds the third holder 20*c* together with the second partition wall 12*f*. More specifically, as illustrated in FIG. 23B, the second outer wall 13*b*' includes an opposing wall that opposes the second partition wall 12*f*, and side walls that respectively extend from each end of the opposing wall toward the second partition wall 12*f*. The third contact 10*c*' is surrounded by the opposing wall and the side walls, and the second partition wall 12*f*.

As illustrated in FIG. 23B, the second outer wall 13*b*' is connected to the ground electrode 41 of the second substrate 2*b*. That is, the second outer wall 13*b*' is grounded to the second substrate 2*b*. Additionally, when viewed from the z2-axis direction, the second outer wall 13*b*' is arranged outward from an outer shape that includes the end of the substrate connector 21*a* of the third contact 10*c*'. In the present embodiment, the entire third contact 10*c*' is surrounded by ground members.

As illustrated in FIG. 23B, in the second shell 50*b*', the second partition wall 12*f* and the second outer wall 13*b*' are coupled. A recess is formed, by the second partition wall 12*f* and the second outer wall 13*b*', that surrounds the third contact 10*c*'. When the plug connector 1*d* and the receptacle connector 1*c* are fitted together, an annular protrusion, formed by the first partition wall 12*e*, the first outer wall 13*a*', and the first coupler 14*a* of the receptacle connector 1*c*, is fitted into this recess.

A stopper 16*b* is provided on the second outer wall 13*b*'. The stopper 16*b* is a portion that is recessed relative to the wall main body, and is provided at one location on each of the side walls.

As illustrated in FIG. 23B, in the plug connector 1*d*, the third contact 10*c*' and the fourth contact 10*d*' are partitioned by the second partition wall 12*f*. Additionally, the third contact 10*c*' is surrounded on four sides by the second outer wall 13*b*' and the second partition wall 12*f*. In the plug connector 1*d*, the second partition wall 12*f* is arranged such that a large portion of the third contact 10*c*' cannot be seen from the fourth contact 10*d*'. In particular, the second partition wall 12*f* is arranged such that the substrate connector 21*a* of the third contact 10*c*' cannot be seen from the substrate connector 21*a* of the fourth contact 10*d*'.

Next, the operations of the electrical connector pair 1 according to the present embodiment are described.

Figure 24A:
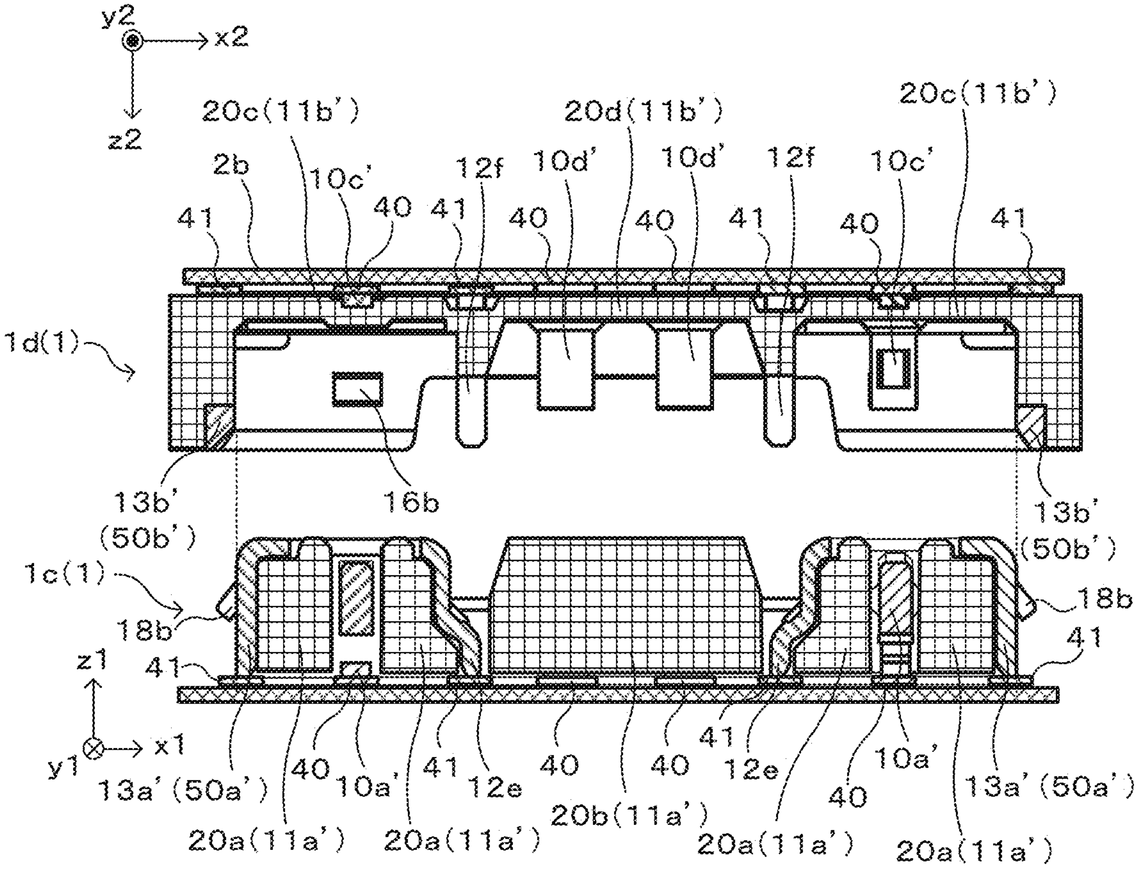
FIG. 24A is a cross-sectional view taken along line D-D of FIG. 21A, and a cross-sectional view taken along line E-E of FIG. 21B, of a state in which the receptacle connector and the plug connector are made to face each other.

As illustrated in FIG. 24A, the receptacle connector 1*c* and the plug connector 1*d* are made to face each other such that the +z1-axis direction and the +z2-axis direction are opposite directions. Furthermore, provided that the first shell 50*a*' is configured to be accommodated in the inner periphery of the second shell 50*b*', the positions of the annular (frame-like) protrusion formed by the first partition wall 12*e*, the first outer wall 13*a*', and the first coupler 14*a*, and the recess formed by the second outer wall 12*f* and the second outer wall 13*b*' match. Guiding by the protrusion and the recess makes it possible to fit the plug connector 1*d* and the receptacle connector 1*c* together. As a result, the stopper 16*a* (see FIG. 23A) and the stopper 16*b* (see FIG. 23B) engage. Additionally, the elastic contactor 18*a* of the first partition wall 12*e* presses against and contacts the second partition wall 12*f*, and the elastic contactor 18*b* of the first outer wall 13*a*' presses against and contacts the second outer wall 13*b*'.

Figure 24B:
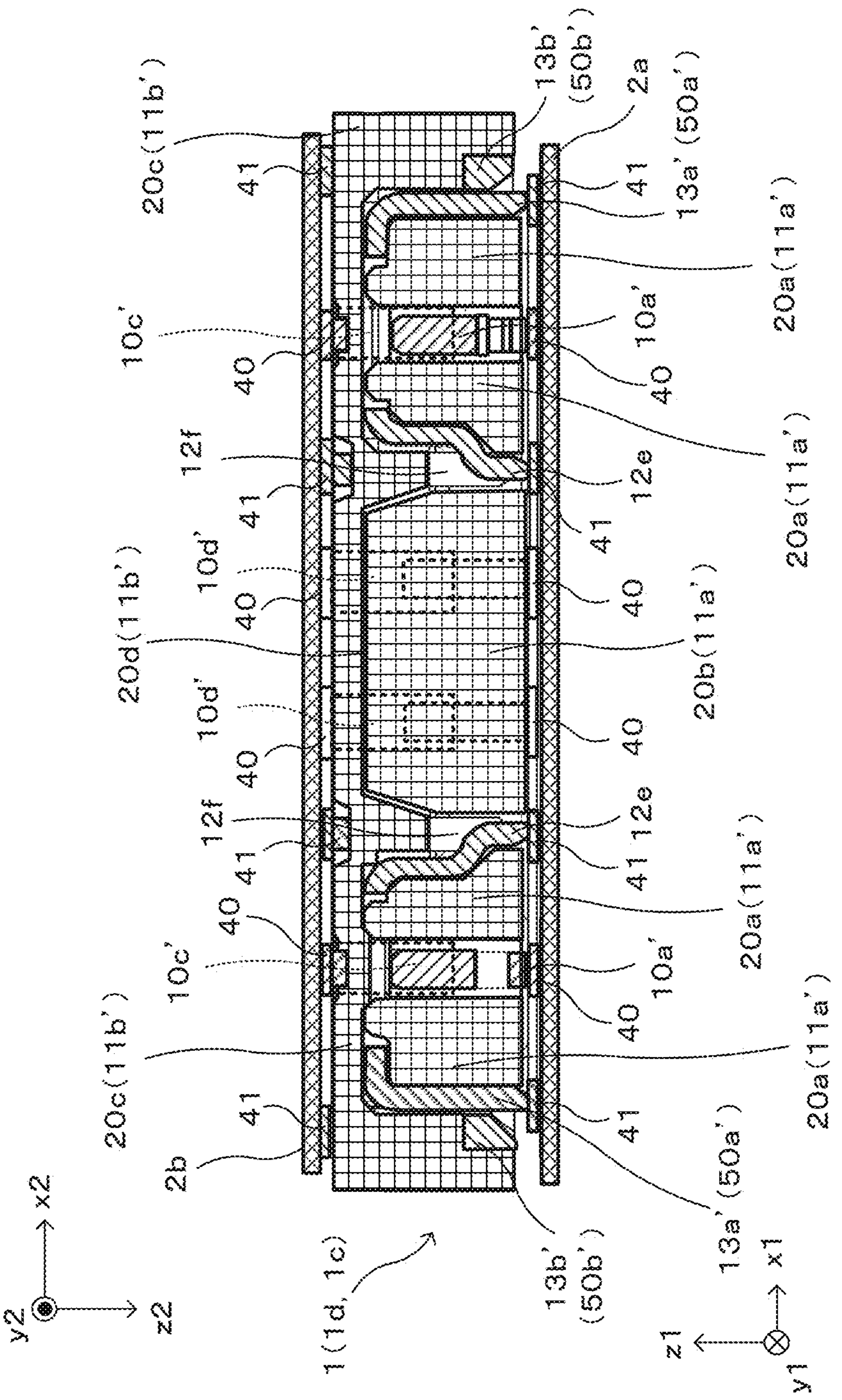
FIG. 24B is a cross-sectional view taken along line D-D of FIG. 21A, and a cross-sectional view taken along line E-E of FIG. 21B, of a state in which the receptacle connector and the plug connector are fitted together.

As illustrated in FIG. 24B, when the receptacle connector 1*c* and the plug connector 1*d* are fitted together, the first contact 10*a*' and the third contact 10*c*' contact. As a result, a signal transmission path, specifically, the signal electrode 40 of the first substrate 2*a*→the first contact 10*a*'→the third contact 10*c*'→the signal electrode 40 of the second substrate 2*b* is formed.

Additionally, when the receptacle connector 1*c* and the plug connector 1*d* are fitted together, as with the first contact 10*a*' and the third contact 10*c*', the second contact 10*b*' and the fourth contact 10*d*' contact. As a result, a signal transmission path, specifically, the signal electrode 40 of the first substrate 2*a*→the second contact 10*b*'→the fourth contact 10*d*'→the signal electrode 40 of the second substrate 2*b* is formed.

Furthermore, when the receptacle connector 1*c* and the plug connector 1*d* are fitted together, the first partition wall 12*e* and the second partition wall 12*f* become adjacent in the x1-axis direction, and assume a contacting state. In this case, the second contact 10*b*' and the fourth contact 10*d*', and the first contact 10*a*' and the third contact 10*c*' are doubly partitioned by the first partition wall 12*e* and the second partition wall 12*f*. Due to the first partition wall 12*e* and the second partition wall 12*f*, the first contact 10*a*' and the third contact 10*c*' cannot be seen from the second contact 10*b*' and the fourth contact 10*d*'. As a result, electromagnetic noise that is introduced to the second contact 10*b*' and the fourth contact 10*d*' from the first contact 10*a*' and the third contact 10*c*' can be reduced and, furthermore, leakage of electromagnetic noise from the second contact 10*b*' and the fourth contact 10*d*' to the first contact 10*a*' and the third contact 10*c*' can be further reduced.

Embodiment 5

Figure 25A:
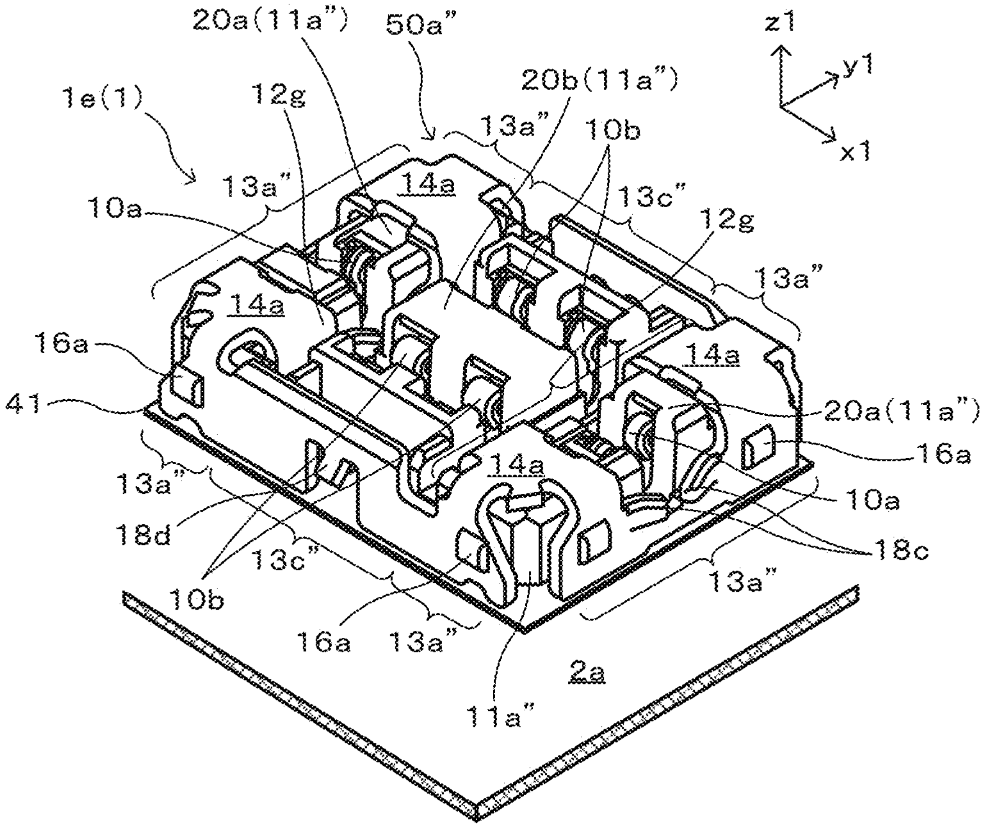
FIG. 25A is a perspective view illustrating the configuration of a receptacle connector of an electrical connector pair according to Embodiment 5 of the present disclosure.
Figure 25B:
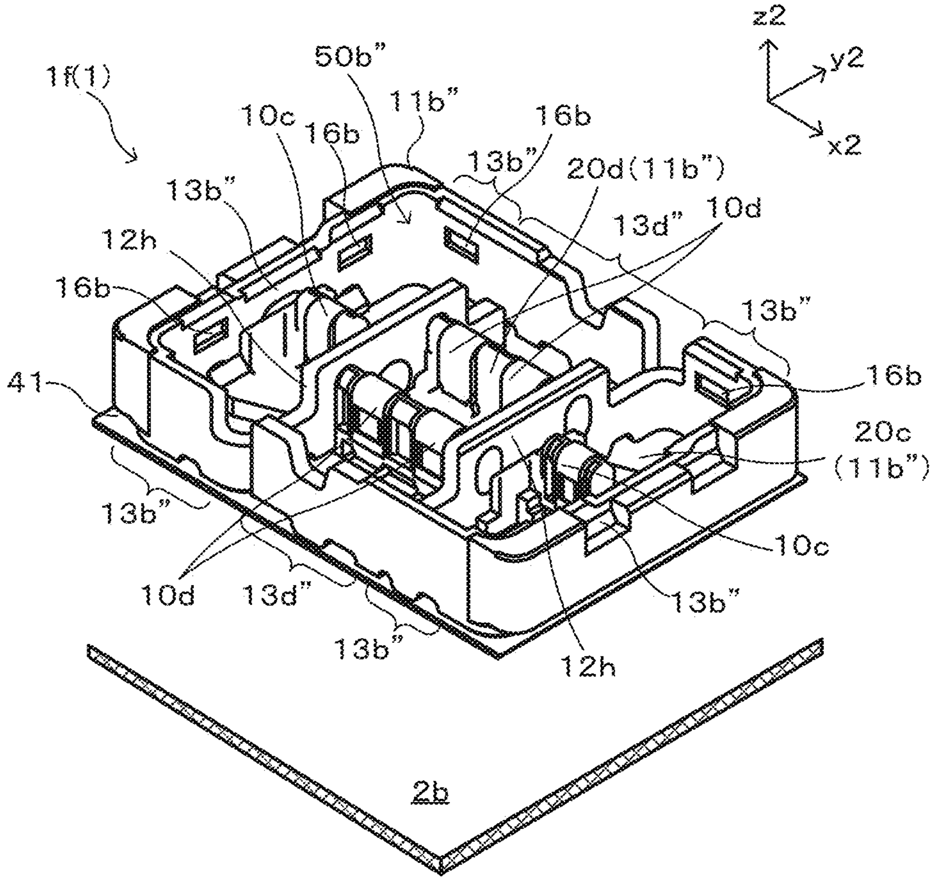
FIG. 25B is a perspective view illustrating the configuration of a plug connector of the electrical connector pair according to Embodiment 5 of the present disclosure.

Next, Embodiment 5 of the present disclosure is described. As illustrated in FIGS. 25A and 25B, an electrical connector pair 1 according to the present embodiment includes a receptacle connector 1*e* as a first connector, and a plug connector 1*f* as a second connector. The receptacle connector 1*e* is mounted on a main surface of a first substrate 2*a*, and the plug connector 1*f* is mounted on a main surface of a second substrate 2*b*.

Receptacle Connector

As illustrated in FIG. 25A, the receptacle connector 1*e* includes a first contact 10*a* that is an electrically conductive member, a second contact 10*b* that is an electrically conductive member, a first housing 11*a*" that is an insulating member, a first partition wall 12*g* that is an electrically conductive member, a first outer wall 13*a*" that is an electrically conductive member, and a third outer wall 13*c*" that is an electrically conductive member.

The configurations, shapes, and arrangements of the first contact 10*a* and the second contact 10*b* are the same as the configurations, shapes, and arrangements of the first contact 10*a* and the second contact 10*b* of the receptacle connector 1*a* according to the embodiments described above. However, the sizes of the first contact 10*a* and the second contact 10*b* according to the present embodiment differ from those of the first contact 10*a* and the second contact 10*b* according to Embodiment 1. Specifically, a width in the x1-axis direction of the first contact 10*a* is smaller than that of the second contact 10*b*.

The first partition wall 12*g* is held by the first housing 11*a*" so as to partition the first holder 20*a* and the second holder 20*b*. Since the first holder 20*a* is provided at both ends in the x1-axis direction of the second holder 20*b*, the first partition wall 12*g* is provided at each of both ends in the x1-axis direction of the second holder 20*b*. The two first partition walls 12*g* each extend in the y1-axis direction and partition the first holder 20*a* and the second holder 20*b*.

As illustrated in FIG. 25A, an elastic contactor 18*c* is provided on the first partition wall 12*g*. The elastic contactor 18*c* projects convexly from the wall main body of the first partition wall 12*g*.

The receptacle connector 1*e* includes a first shell 50*a*" that, when viewing from the z1-axis direction, surrounds the first housing 11*a*" on four sides. In one example, the first shell 50*a*" is a metal member, and the first outer wall 13*a*" and the third outer wall 13*c*" are portions of the first shell 50*a*".

Figure 26A:
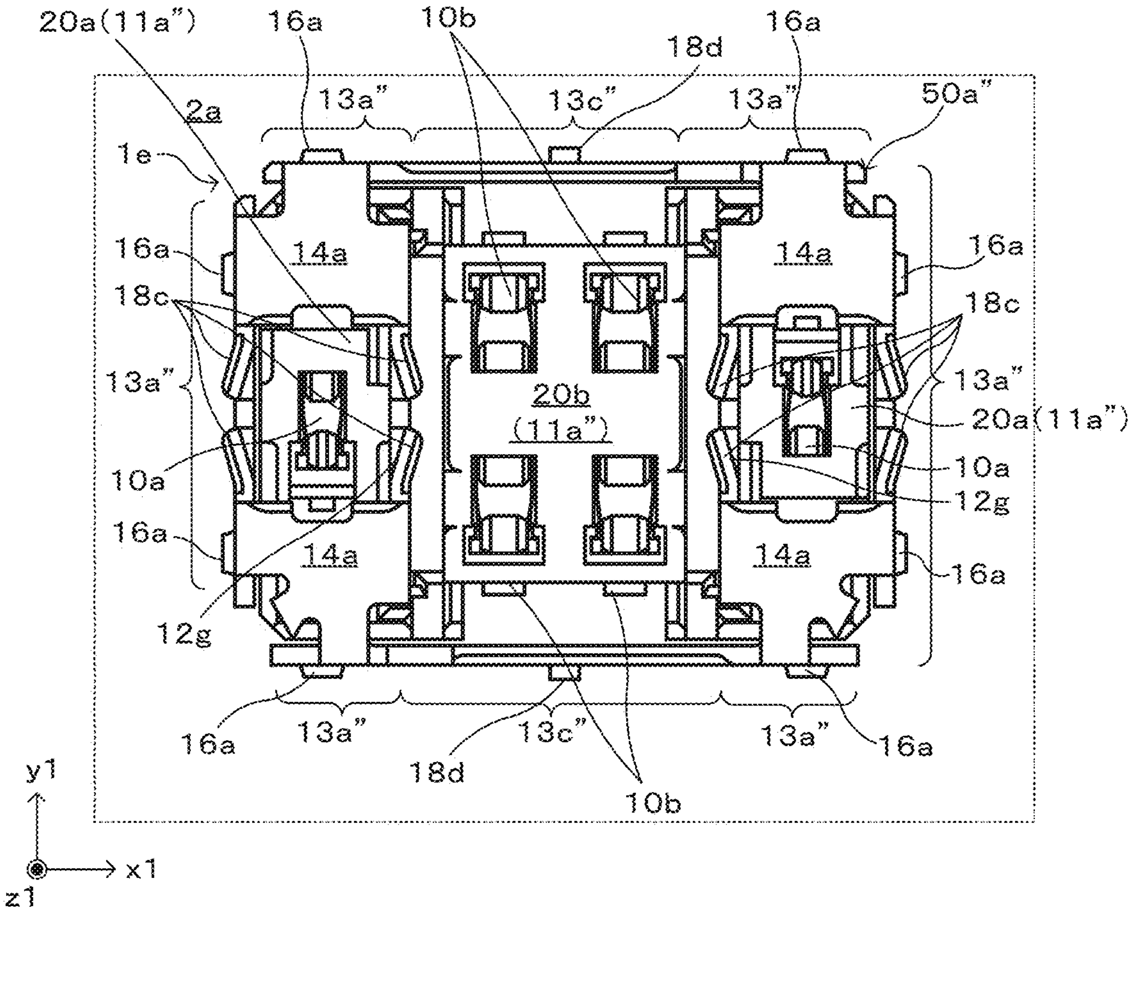
FIG. 26A is a top view of the receptacle connector of FIG. 25A.
Figure 26B:
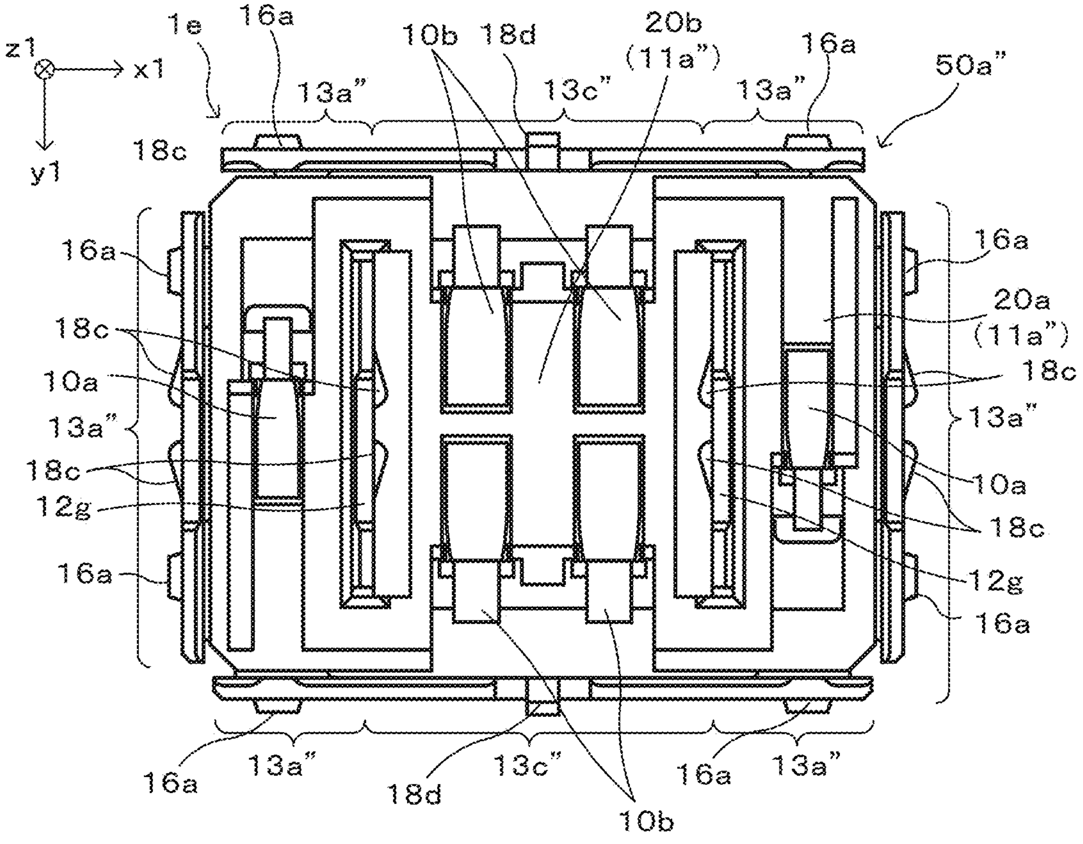
FIG. 26B is a bottom view of the receptacle connector of FIG. 25A.

As illustrated in FIGS. 26A and 26B, the first outer wall 13*a*" is a portion of the first shell 50*a*" that, when viewed from the z1-axis direction, surrounds the first holder 20*a* together with the first partition wall 12*g*. More specifically, the first outer wall 13*a*" includes an opposing wall that opposes the first partition wall 12*g*, and side walls that respectively extend from each end of the opposing wall toward the third outer wall 13_c_". The first contact 10_a_ is surrounded by the opposing wall and the side walls, and the first partition wall 12_g_.

The first outer wall 13_a_" is connected to the ground electrode 41 of the first substrate 2_a_. Specifically, the first outer wall 13_a_" is grounded to the first substrate 2_a_.

The first shell 50_a_" includes an electrically conductive first coupler 14_a_ that couples the first partition wall 12_g_ and the first outer wall 13_a_". The first coupler 14_a_ is a plate-like member that intersects the line normal to the main surface of the first substrate 2_a_ (straight line in the z1-axis direction). The first coupler 14_a_ couples the first partition wall 12_g_ and the first outer wall 13_a_" on the side far from the first substrate 2_a_. Due to this, an annular (frame-like) protrusion is formed, by the first partition wall 12_g_, the first outer wall 13_a_", and the first coupler 14_a_, that surrounds the first contact 10_a_. This annular protrusion functions as an electromagnetic shielding member between the first contact 10_a_ and outside.

When viewing from the z1-axis direction, the third outer wall 13_c_" is integrated with the first outer wall 13_a_" and surrounds the first housing 11_a_" on four sides. The third outer wall 13_c_" is a portion that, when viewed from the z1-axis direction, surrounds the second holder 20_b_ of the first housing 11_a_ together with the first partition wall 12_g_. Note that the third outer wall 13_c_" can be regarded as an electrically conductive member that connects a pair of the first outer walls 13_a_" to each other.

An elastic contactor 18_d_ is provided on the first partition wall 12_g_ and the first outer wall 13_a_". The elastic contactor 18_d_ projects convexly from the wall main body, and is provided at one location at the center in the y1-axis direction.

As illustrated in FIGS. 26A and 26B, a stopper 16_a_ is provided on the first outer wall 13_a_". The stopper 16_a_ protrudes convexly from the wall main body toward the outer periphery.

In the receptacle connector 1_e_, the first contact 10_a_ and the second contact 10_b_ are partitioned by the first partition wall 12_g_. Additionally, the first contact 10_a_ is surrounded on four sides by the first outer wall 13_a_" and the first partition wall 12_g_, and the second contact 10_b_ is surrounded on four sides by the third outer wall 13_c_" and the first partition wall 12_g_. In the receptacle connector 1_e_, the first partition wall 12_g_ is arranged such that the first contact 10_a_ cannot be seen from the second contact 10_b_.

Plug Connector

Next, the configuration of the plug connector 1_f_ is described. As illustrated in FIG. 25B, the plug connector 1_f_ includes a third contact 10_c_ that is an electrically conductive member, a fourth contact 10_d_ that is an electrically conductive member, a second housing 11_b_" that is an insulating member, a second partition wall 12_h_ that is an electrically conductive member, a second outer wall 13_b_" that is an electrically conductive member, and a fourth outer wall 13_d_" that is an electrically conductive member.

The configurations, shapes, and arrangements of the third contact 10_c_ and the fourth contact 10_d_ are the same as the configurations, shapes, and arrangements of the third contact 10_c_ and the fourth contact 10_d_ of the receptacle connector 1_a_ according to the embodiments described above. However, the sizes of the third contact 10_c_ and the fourth contact 10_d_ according to the present embodiment differ from those of the third contact 10_c_ and the fourth contact 10_d_ according to Embodiment 1. Specifically, the width in the x1-axis direction of the third contact 10_c_ is smaller than that of the fourth contact 10_d_.

The second housing 11_b_" includes a third holder 20_c_ that holds the third contact 10_c_, and a fourth holder 20_d_ that holds the fourth contact 10_d_. The fourth holder 20_d_ is arranged at the center in the x2-axis direction, and the third holder 20_c_ is arranged at each end in the x2-axis direction.

The second partition wall 12_h_ is held by the second housing 11_b_" so as to partition the third holder 20_c_ and the fourth holder 20_d_. Since the third holder 20_c_ is provided at both ends in the x2-axis direction of the fourth holder 20_d_, the second partition wall 12_h_ is provided at each of both ends in the x2-axis direction of the fourth holder 20_d_. The two second partition walls 12_h_ each extend in the y2-axis direction and partition the third holder 20_c_ and the fourth holder 20_d_.

The plug connector 1_f_ includes a second shell 50_b_" that is a metal member and that, when viewing from the z2-axis direction, surrounds the second housing 11_b_" on four sides. The second outer wall 13_b_" and the fourth outer wall 13_d_" are portions of the second shell 50_b_". The second shell 50_b_" has a size that contacts an outer peripheral portion of the first shell 50_a_" of the receptacle connector 1_a_.

Figure 27A:
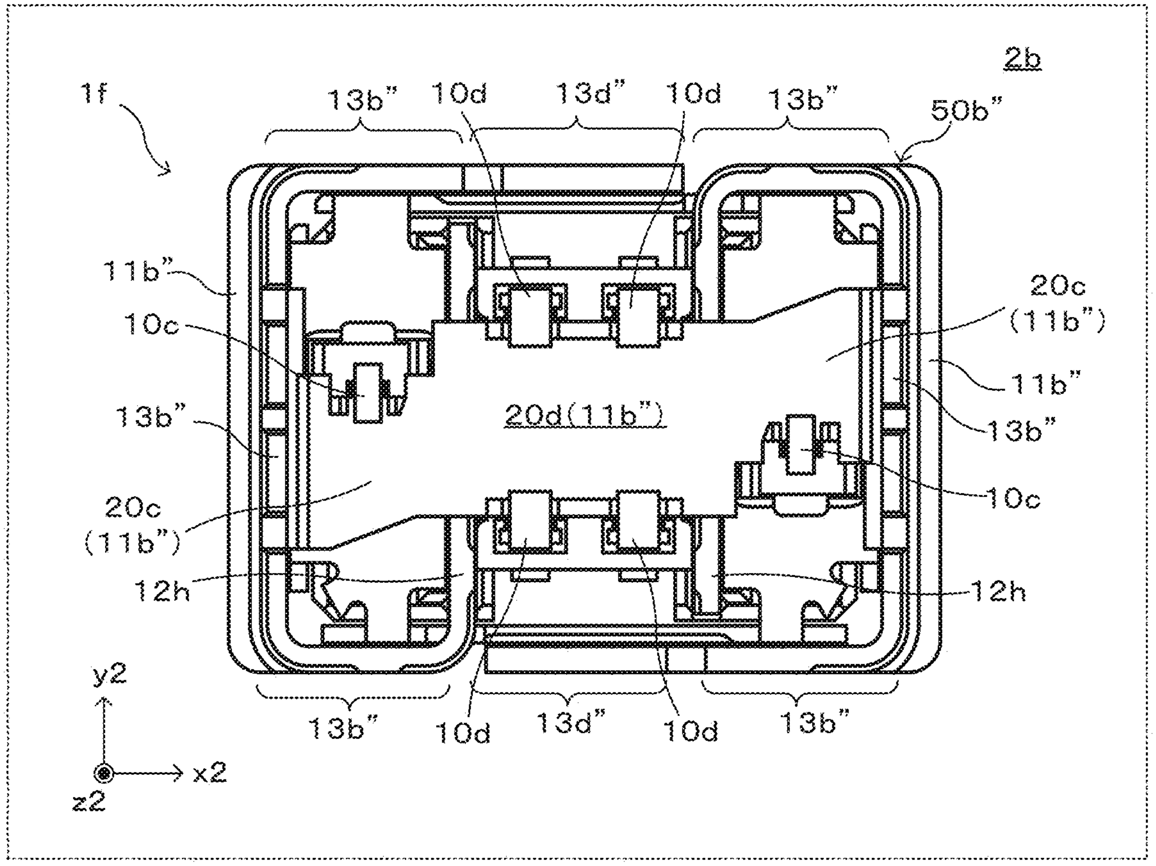
FIG. 27A is a top view of the plug connector of FIG. 25B.
Figure 27B:
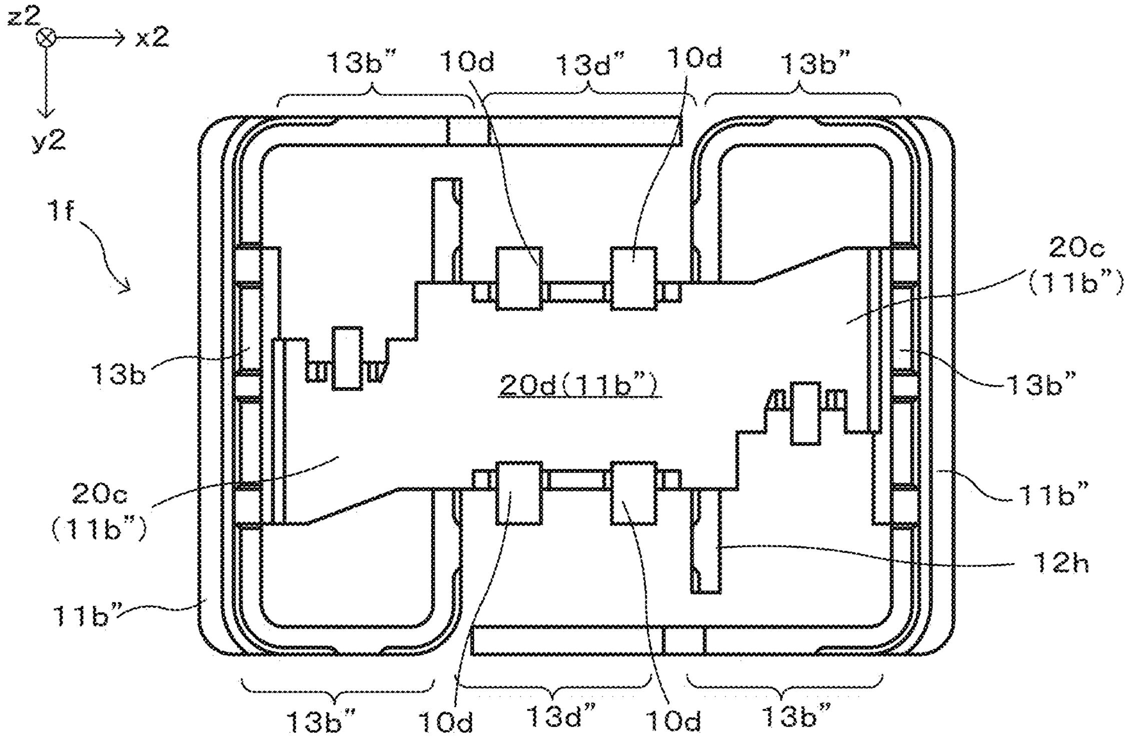
FIG. 27B is a bottom view of the plug connector of FIG. 25B.

As illustrated in FIGS. 27A and 27B, the second outer wall 13_b_" is a portion of the second shell 50_b_" that, when viewed from the direction of the line normal to the main surface of the second substrate 2_b_, surrounds the third holder 20_c_ together with the second partition wall 12_h_. More specifically, the second outer wall 13_b_" includes an opposing wall that opposes the second partition wall 12_h_, and side walls that respectively extend from each end of the opposing wall toward the second partition wall 12_h_. The third contact 10_c_ is surrounded by the opposing wall and the side walls, and the second partition wall 12_h_.

The second outer wall 13_b_" is connected to the ground electrode 41 of the second substrate 2_b_. That is, the second outer wall 13_b_" is grounded to the second substrate 2_b_. Additionally, when viewed from the z2-axis direction, the second outer wall 13_b_" is arranged outward from an outer shape that includes the end of the substrate connector 21_a_ of the third contact 10_c_. In the present embodiment, the entire third contact 10_c_ is surrounded by ground members.

In the second shell 50_b_", the second partition wall 12_h_ and the second outer wall 13_b_" are coupled. A recess is formed, by the second partition wall 12_h_ and the second outer wall 13_b_", that surrounds the third contact 10_c_. When the plug connector 1_f_ and the receptacle connector 1_e_ are fitted together, the annular protrusion, formed by the first partition wall 12_g_, the first outer wall 13_a_", and the first coupler 14_a_ of the receptacle connector 1_e_, is fitted into this recess.

A stopper 16_b_ is provided on the second outer wall 13_b_". The stopper 16_b_ is recessed relative to the wall main body, and is provided at one location of the side wall, and two locations of the opposing wall.

As illustrated in FIGS. 27A and 27B, in the plug connector 1_f_, the third contact 10_c_ and the fourth contact 10_d_ are partitioned by the second partition wall 12_h_. Additionally, the third contact 10_c_ is surrounded on four sides by the second outer wall 13_b_" and the second partition wall 12_h_. In the plug connector 1_f_, the second partition wall 12_h_ is arranged such that the third contact 10_c_ cannot be seen from the fourth contact 10_d_. In particular, the second partition wall 12_h_ is arranged such that the substrate connector 21_a_ of the third contact 10_c_ cannot be seen from the substrate connector 21_a_ of the fourth contact 10_d_.

Next, the operations of the electrical connector pair 1 according to the present embodiment are described.

The receptacle connector 1*e* and the plug connector 1*f* are made to face each other such that the +z1-axis direction and the +z2-axis direction are opposite directions. Furthermore, provided that the first shell 50*a*" is configured to be accommodated in the inner periphery of the second shell 50*b*", the positions of the annular (frame-like) protrusion formed by the first partition wall 12*g*, the first outer wall 13*a*", and the first coupler 14*a*, and the recess formed by the second outer wall 12*h* and the second outer wall 13*b*" match. Guiding by the protrusion and the recess makes it possible to fit the plug connector 1*f* and the receptacle connector 1*e* together.

Figure 28:
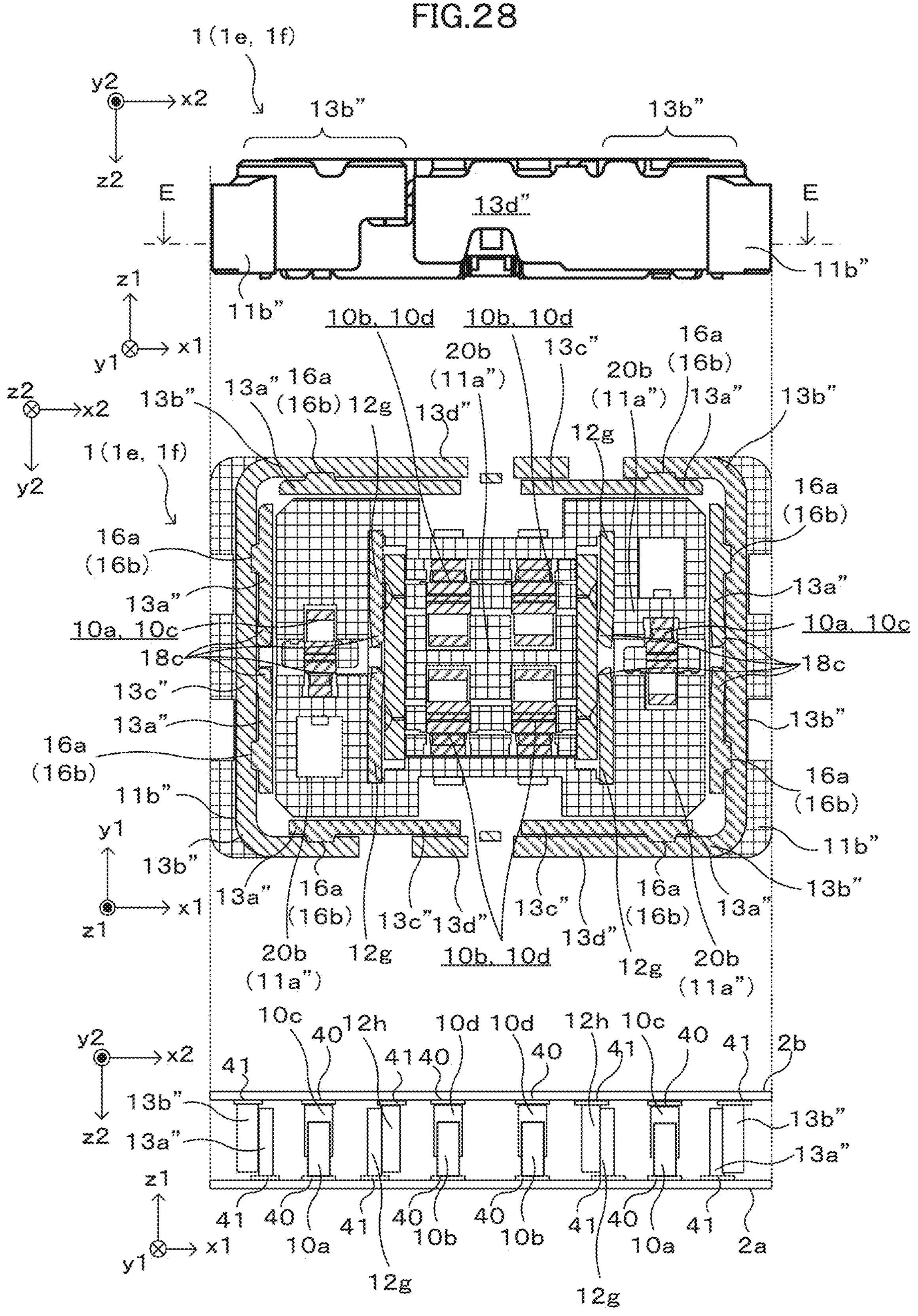
FIG. 28 is schematic drawing illustrating a state in which the receptacle connector of FIG. 25A and the plug connector of FIG. 25B are fitted together.

As illustrated in FIG. 28, when the receptacle connector 1*e* and the plug connector 1*f* are fitted together, the stopper 16*a* and the stopper 16*b* engage. Additionally, the elastic contactor 18*c* presses against and contacts the second partition wall 12*h* and the third outer wall 13*c*", and the elastic contactor 18*d* presses against and contacts the fourth outer wall 13*d*". As a result, the fitting strength of receptacle connector 1*e* and the plug connector 1*f* can be enhanced.

Additionally, when the receptacle connector 1*e* and the plug connector 1*f* are fitted together, the first contact 10*a* and the third contact 10*c* contact. As a result, a signal transmission path, specifically, the signal electrode 40 of the first substrate 2*a*→the first contact 10*a*→the third contact 10*c*→the signal electrode 40 of the second substrate 2*b* is formed.

Additionally, when the receptacle connector 1*e* and the plug connector 1*f* are fitted together, as with the first contact 10*a* and the third contact 10*c*, the second contact 10*b* and the fourth contact 10*d* contact. As a result, a signal transmission path, specifically, the signal electrode 40 of the first substrate 2*a*→the second contact 10*b*→the fourth contact 10*d*→the signal electrode 40 of the second substrate 2*b* is formed.

Furthermore, when the receptacle connector 1*e* and the plug connector 1*f* are fitted together, the first partition wall 12*g* and the second partition wall 12*h* become adjacent in the x1-axis direction, and assume a contacting state. In this case, the second contact 10*b* and the fourth contact 10*d*, and the first contact 10*a* and the third contact 10*c* are doubly partitioned by the first partition wall 12*g* and the second partition wall 12*h*. Due to the first partition wall 12*g* and the second partition wall 12*h*, the first contact 10*a* and the third contact 10*c* cannot be seen from the second contact 10*b* and the fourth contact 10*d*. As a result, electromagnetic noise that is introduced to the second contact 10*b* and the fourth contact 10*d* from the first contact 10*a* and the third contact 10*c* can be reduced and, furthermore, leakage of electromagnetic noise from the second contact 10*b* and the fourth contact 10*d* to the first contact 10*a* and the third contact 10*c* can be further reduced.

As described in detail above, with the electrical connector pair 1 according to some embodiments described above, the receptacle connector 1*a* includes the electrically conductive first partition wall 12*a* that partitions the first contact 10*a* and the second contact 10*b*. Additionally, the plug connector 1*b* includes the electrically conductive second partition wall 12*b* that partitions the third contact 10*c* and the fourth contact 10*d* member. When the receptacle connector 1*a* and the plug connector 1*b* fitted together, the first partition wall 12*a* and the second partition wall 12*b* partition the first contact 10*a* and the third contact 10*c*, and the second contact 10*b* and the fourth contact 10*d*. Due to this configuration, the first partition wall 12*a* and the second partition wall 12*b* can reflect the electromagnetic noise generated by the second contact 10*b* and the fourth contact 10*d*, and the electromagnetic noise thereof can be prevented from becoming introduced into the electrical signals transmitted through the first contact 10*a* and the third contact 10*c*. As a result, the noise that is introduced into the transmission lines of the signal can be reduced.

Likewise, with the electrical connector pair 1 according to some embodiments described above, the first partition wall 12*a* and the second partition wall 12*b* can reflect the electromagnetic noise generated by the first contact 10*a* and the third contact 10*c*, and the electromagnetic noise thereof can be prevented from becoming mixed into the electrical signals transmitted through the second contact 10*b* and the fourth contact 10*d*.

In the receptacle connector 1*a*, the first contact 10*a* and the second contact 10*b* are partitioned by the first partition wall 12*a*, and electromagnetic noise from the second contact 10*b* is restricted from being introduced to the first contact 10*a*. In the present embodiment, the plug connector 1*b* also includes the second partition wall 12*b* that partitions the third contact 10*c* and the fourth contact 10*d* and, in the first partition wall 12*a*, the second partition wall 12*b* blocks a potion that could not be completely blocked, thereby further preventing the passage of electromagnetic noise and further suppressing the introduction of electromagnetic noise.

In the present embodiment, when the receptacle connector 1*a* and the plug connector 1*b* are fitted together, the first partition wall 12*a* partitions the portion of the boundary between the third holder 20*c* and the fourth holder 20*d* where the second partition wall 12*b* is not formed such that the first contact 10*a* and the third contact 10*c* cannot be seen from the second contact 10*b* and the fourth contact 10*d*. With such a configuration, the first partition wall 12*a* and the second partition wall 12*b* complement each other, and can block the electromagnetic waves that radiate from the second and fourth contacts 10*b*, 10*d* or the first and third contacts 10*a*, 10*c*. The first partition wall 12*a* and the second partition wall 12*b* need only partition a portion of the boundary between the first holder 20*a* and the second holder 20*b*, and the third holder 20*c* and the fourth holder 20*d*. As such, the degree of freedom related to the design of the first partition wall 12*a* and the second partition wall 12*b* can be enhanced. Additionally, in the plug connector 1*b*, the second partition wall 12*b* is not coupled to the second shell 50*b* and, as such, deflection of the second partition wall 12*b* due to stress transmitted from the second shell 50*b* is prevented. Furthermore, in the first partition wall 12*a*, the second partition wall 12*b* shields portions where shielding is difficult and, as such, electromagnetic shielding performance can be enhanced.

With the electrical connector pairs 1 according to Embodiments 1 to 5, the first partition wall 12*a* and the second partition wall 12*b* contact when fitted together. This configuration is adopted in order to increase electromagnetic shielding performance. However, it is not required that the first partition wall 12*a* and the second partition wall 12*b* contact when fitted together.

With the electrical connector pair 1 according to Embodiments 1 and 2, when the receptacle connector 1*a* and the plug connector 1*b* are fitted together, the first partition wall 12*a* and the second partition wall 12*b* are engaged by the stoppers 15*a*, 15*b*. As a result, the fitting force between the receptacle connector 1*a* and the plug connector 1*b* can be increased. This point is true for the electrical connector pair 1 according to Embodiments 4 and 5 as well.

With the electrical connector pair 1 according to Embodiments 1 and 2, when the receptacle connector 1*a* and the plug connector 1*b* are fitted together, both constituents are pressed on by the elastic contactors 18*c*, 18*d* and, thereby, contact. As a result, the fitting force between the receptacle connector 1*a* and the plug connector 1*b* can be increased. This point is true for the electrical connector pair 1 according to Embodiments 4 and 5 as well.

With the electrical connector pair 1 according to Embodiments 1 and 2, when the receptacle connector 1*a* and the plug connector 1*b* are fitted together, the second partition wall 12*b* is arranged so as to overlap the first partition wall 12*a* when viewed from the first contact 10*a* and the third contact 10*c*. Due to this configuration, the wall of the conductor is doubled, thereby making it possible to increase the electromagnetic noise shielding performance. This point is true for the electrical connector pair 1 according to Embodiments 4 and 5 as well.

According to Embodiments 1 and 2, the first partition wall 12*a* includes the first end 30*a* that contacts the first substrate 2*a*, and the first ground connector 31*a* that connects to the ground electrode 41 of the first substrate 2*a* is provided on the first end 30*a*. Due to this configuration, the electromagnetic noise component reflected by the first partition wall 12*a* can be quickly released from the first ground connector 31*a*. This point is true for the electrical connector pair 1 according to Embodiments 4 and 5 as well.

According to Embodiment 2, the second partition wall 12*b* includes the second end 30*b* that contacts the second substrate 2*b*, and the second ground connector 31*b* that connects to the ground electrode 41 of the second substrate 2*b* is provided on the second end 30*b*. Due to this configuration, the electromagnetic noise component reflected by the first partition wall 12*a* can be quickly released from the first ground connector 31*a*.

According to the embodiments described above, the receptacle connector 1*a* includes the electrically conductive first outer wall 13*a* that surrounds the first holder 20*a* together with the first partition wall 12*a* when viewed from the direction normal to the main surface of the first substrate 2*a*, and that connects to the ground electrode 41 of the first substrate 2*a*. Furthermore, the plug connector 1*b* includes the electrically conductive second outer wall 13*b* that surrounds the third holder 20*c* together with the second partition wall 12*b* when viewed from the direction normal to the main surface of the second substrate 2*b*, and that connects to the ground electrode 41 of the second substrate 2*b*. Due to this configuration, it is possible to prevent electromagnetic noise from being introduced to the first contact 10*a* and the third contact 10*c* from outside, and to prevent the leaking of electromagnetic noise from the first contact 10*a* and the third contact 10*c* to the outside. This point is true for the electrical connector pair 1 according to Embodiments 4 and 5 as well.

According to the embodiments described above, when the receptacle connector 1*a* and the plug connector 1*b* are fitted together, the first outer wall 13*a* and the second outer wall 13*b* are arranged doubly when viewing from the first contact 10*a* and the third contact 10*c*. Due to this configuration, the wall of the conductor is doubled, thereby making it possible to increase the electromagnetic noise shielding performance. This point is true for the electrical connector pair 1 according to Embodiments 4 and 5 as well.

With the electrical connector pair 1 according to Embodiments 1 to 3, when the receptacle connector 1*a* and the plug connector 1*b* are fitted together, the first outer wall 13*a* and the second outer wall 13*b* engage. As a result, the fitting force between the receptacle connector 1*a* and the plug connector 1*b* can be increased. This point is true for the electrical connector pair 1 according to Embodiments 4 and 5 as well.

According to the embodiments described above, the electrically conductive first coupler 14*a* that couples the first partition wall 12*a* and the first outer wall 13*a* is provided. Additionally, the electrically conductive second coupler 14*b* that couples the second partition wall 12*b* and the second outer wall 13*b* is provided. Coupling the partition walls and the outer walls in this manner enables the further enhancement of electromagnetic shielding performance.

In the embodiments described above, the first coupler 14*a* is a plate-like member that intersects the line normal to the main surface of the first substrate 2*a*, and the second coupler 14*b* is a plate-like member that intersects the line normal to the main surface of the second substrate 2*b*. Due to this configuration, the first coupler 14*a* and the second coupler 14*b* can be made to function as electromagnetic shielding members in the normal line directions of the main surfaces. Note that a configuration is possible in which an electrically conductive coupler that couples the first partition wall 12*a* and the third outer wall 13*c* is provided. Additionally, a configuration is possible in which an electrically conductive couple that couples the second partition wall 12*b*, and the second outer wall 13*b* or the fourth outer wall 13*d* is provided.

With the electrical connector pair 1 according to Embodiments 1 to 3, the annular protrusion that surrounds the first contact 10*a* is formed by the first partition wall 12*a*, the first outer wall 13*a*, and the first coupler 14*a*; and the recess that surrounds the second contact 10*b*, and into which the protrusion is fitted when the receptacle connector 1*a* and the plug connector 1*b* are fitted together is formed by the second partition wall 12*b*, the second outer wall 13*b*, and the second coupler 14*b*. Due to this configuration, the protrusion and the recess can be made to function as guide member when fitting the receptacle connector 1*a* and the plug connector 1*b* together. This point is true for the electrical connector pair 1 according to Embodiments 4 and 5 as well.

In the electrical connector pair 1 according to Embodiments 1 to 3, in the receptacle connector 1*a*, the pair of first outer walls 13*a* is coupled by the third outer wall 13*c* that is an electrically conductive member and, in the plug connector 1*b*, the pair of second outer walls 13*b* is coupled by the fourth outer wall 13*d* that is an electrically conductive member. Due to this configuration, the potential of the pair of first outer walls 13*a* is made the same and, as a result, the electric and magnetic field environments surrounding the signals flowing through the pairs of first contacts 10*a* and third contacts 10*c* can be made uniform. This point is true for the electrical connector pair 1 according to Embodiment 5 as well.

With the electrical connector pair 1 according to Embodiments 1 to 3, the receptacle connector 1*a* includes the electrically conductive third outer wall 13*c* that surrounds the second holder 20*b* together with the first partition wall 12*a* when viewed from the direction normal to the main surface of the first substrate 2*a*. Additionally, the plug connector 1*b* includes the electrically conductive fourth outer wall 13*d* that surrounds the fourth holder 20*d* together with the second partition wall 12*b* when viewed from the direction normal to the main surface of the second substrate 2*b*. Due to this configuration, it is possible to prevent electromagnetic noise from being introduced to the second contact 10*b* and the fourth contact 10*d* from outside, and to prevent the leaking of electromagnetic noise from the second contact 10*b* and the fourth contact 10*d* to the outside. This point is true for the electrical connector pair 1 according to Embodiment 5 as well.

With the electrical connector pair 1 according to Embodiments 1 to 3, when the receptacle connector 1*a* and the plug connector 1*b* are fitted together, the third outer wall 13*c* and the fourth outer wall 13*d* are arranged doubly when viewing from the second contact 10*b* and the fourth contact 10*d*. Due to this configuration, the wall of the conductor is doubled, thereby making it possible to increase the electromagnetic noise shielding performance. This point is true for the electrical connector pair 1 according to Embodiment 5 as well.

With the electrical connector pair 1 according to Embodiments 1 and 3, when the receptacle connector 1*a* and the plug connector 1*b* fitted together, the third outer wall 13*c* and the fourth outer wall 13*d* are engaged by the stoppers 16*a*, 16*b*. Due to this configuration, the fitting force between the receptacle connector 1*a* and the plug connector 1*b* can be increased. This point is true for the electrical connector pair 1 according to Embodiment 5 as well.

With the electrical connector pair 1 according to Embodiments 1 to 3, the first outer wall 13*a* and the third outer wall 13*c* are integrated, and the second outer wall 13*b* and the fourth outer wall 13*d* are integrated. Due to this configuration, the outer walls are coupled, thereby making it possible to enhance the electromagnetic noise shielding performance. This point is true for the electrical connector pair 1 according to Embodiment 5 as well.

With the electrical connector pair 1 according to Embodiments 1 to 3, in the receptacle connector 1*a*, the pair of first holders 20*a* is arranged so as to sandwich the second holder 20*b* and, in the plug connector 1*b*, the pair of third holders 20*c* is arranged so as to sandwich the fourth holder 20*d*. Due to this configuration, it is possible to shield the electromagnetic noise from one of the first contacts 10*a* and the third contact 10*c* to the other of the first contact 10*a* and the third contact 10*c* by the doubled first partition wall 12*a* and second partition wall 12*b*. Additionally, the space between one of the first contact 10*a* and the third contact 10*c* and the other of the first contact 10*a* and the third contact 10*c* is widened, and second contact 10*b* and the fourth contact 10*d* are arranged in that space. As a result, electromagnetic noise that affects the signals generated from the one of the first contact 10*a* and the third contact 10*c* and transmitted to the other of the first contact 10*a* and the third contact 10*c* can be minimized. This point is true for the electrical connector pair 1 according to Embodiments 4 and 5 as well.

In the embodiments described above, the shapes of the receptacle connectors 1*a*, 1*c*, 1*e* and the plug connectors 1*b*, 1*b*', 1*d*, 1*f* are configured with the x1-axis direction and the x2-axis direction as the longitudinal direction, but the present disclosure is not limited thereto. A configuration is possible in which the y1-axis direction and the y2-axis direction are set as the longitudinal direction, or the overall shapes are square. Furthermore, a configuration is possible in which the shapes of the receptacle connector 1*a* and the plug connector 1*b* are not rectangular.

With the receptacle connector 1*a* and the plug connector 1*b* according to Embodiments 1 to 3, pairs of the first contact 10*a* and the third contact 10*c* are provided, and four of the second contact 10*b* and the fourth contact 10*d* are provided, but it is sufficient that these numbers be greater than or equal to one. This point is true for the electrical connector pair 1 according to Embodiments 4 and 5 as well.

In the embodiments described above, when viewing from the z1-axis and the z2-axis directions, the first contact 10*a* and the third contact 10*c*, and the second contact 10*b* and the fourth contact 10*d* are arranged in directions such that the x1-axis and x2-axis directions are the longitudinal direction, but the present disclosure is not limited thereto. The directions of the first contact 10*a* and the third contact 10*c* are not limited. This is true from the second contact 10*b* and the fourth contact 10*d* as well.

Shapes other than those described in the embodiments can be used for the shapes of the first contact 10*a* and the third contact 10*c*, and the second contact 10*b* and the fourth contact 10*d*. For example, a configuration is possible in which the shapes of the first contact 10*a* and the second contact 10*b* differ. This is true for the shapes of the third contact 10*c* and the fourth contact 10*d* as well.

A configuration is possible in which the frequency band of the signal to be transmitted, the current, the voltage, the use (for signal transmission or for grounding), and the like of the first contact 10*a*, 10*a*' and the third contact 10*c*, 10*c*', and the second contact 10*b*, 10*b*' and the fourth contact 10*d*, 10*d*' differ. For example, a configuration is possible in which the first contact 10*a*, 10*a*' and the third contact 10*c*, 10*c*' transmit a high-frequency signal, and the second contact 10*b*, 10*b*' and the fourth contact 10*d*, 10*d*' transmit a low-frequency signal.

The first contact 10*a*, 10*a*' and the third contact 10*c*, 10*c*', and the second contact 10*b*, 10*b*' and the fourth contact 10*d*, 10*d*' can be formed by punching, bending, or the like of one plate material from a metal thin plate. The substrate connector 21*a*, 21*b* may have any shape provided that connection to the signal electrode 40 is possible, and may have a shape that does not project outward.

The first housing 11*a*, 11*a*' and the second housing 11*b*, 11*b*' can be formed by injection molding of resin material. Alternatively, the first housing 11*a*, 11*a*' and the second housing 11*b*, 11*b*' can be formed by three-dimensional printing or other molding techniques.

In the embodiments described above, the first housing 11*a*, 11*a*' includes a pair of the first holder 20*a* and one of the second holder 20*b*, but the present disclosure is not limited thereto. A configuration is possible in which one each of the first holder 20*a* and the second holder 20*b* is provided. Thus, the number and arrangement of the first holder 20*a* and the number and arrangement of the second holder 20*b* are not limited. For example, a configuration is possible in which a pair of the second holder 20*b* sandwiches the first holder 20*a*. In any case, in the electrical connector pair 1, the third holder 20*c* opposes the first holder 20*a* and the fourth holder 20*d* opposes the second holder 20*b*.

In one example, the first shell 50*a*, 50*a*', 50*a*" and the second shell 50*b*, 50*b*', 50*b*" are formed by punching a single layer plate material from a metal thin plate, and bending the obtained plate material. However, the present disclosure is not limited thereto. A configuration is possible in which two or more plate materials are combined to form the first shell 50*a*, 50*a*', 50*a*" and the second shell 50*b*, 50*b*', 50*b*". The first shell 50*a*, 50*a*', 50*a*" and the second shell 50*b*, 50*b*', 50*b*" are fixed to the first housing 11*a* and the second housing 11*b* by press-fitting.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-222381, filed on Dec. 9, 2019, the entire disclosure of which is incorporated by reference herein.

INDUSTRIAL APPLICABILITY

The present disclosure can be applied to electrical connectors that connect substrates. For example, the present disclosure can be applied to a device or the like that is used to connect circuit boards in an electronic device. Specific examples of the electronic device include portable communication terminals such as mobile phones, smartphones, laptop computers, and tablet computers, but are not limited thereto.

REFERENCE SIGNS LIST

1 Electrical connector pair
1*a*, 1*c*, 1*e* Receptacle connector
1*b*, 1*b*', 1*d*, 1*f* Plug connector
2*a* First substrate
2*b* Second substrate
10*a*, 10*a*' First contact
10*b*, 10*b*' Second contact
10*c*, 10*c*' Third contact
10*d*, 10*d*' Fourth contact
11*a*, 11*a*', 11*a*" First housing
11*b*, 11*b*', 11*b*" Second housing
12*a*, 12*a*', 12*c*, 12*e*, 12*g* First partition wall
12*b*, 12*b*', 12*d*, 12*f*, 12*h* Second partition wall
13*a*, 13*a*', 13*a*" First outer wall
13*b*, 13*b*', 13*b*" Second outer wall
13*c*, 13*c*', 13*c*" Third outer wall
13*d*, 13*d*" Fourth outer wall
14*a* First coupler
14*b* Second coupler
15*a*, 15*b*, 15*c*, 15*d* Stopper
16*a*, 16*b* Stopper
17*a*, 17*b* Stopper
18*a*, 18*b*, 18*c*, 18*d* Elastic contactor
20*a* First holder
20*b* Second holder
20*c* Third holder
20*d* Fourth holder
21*a*, 21*b* Substrate connector
22*a*, 22*b* Rising portion
23*a*, 23*b* Contact contactor
24*a* Protrusion
24*b* Recess
30*a* First end
30*b* Second end
31*a*, 31*a*' First ground connector
31*b* Second ground connector
40 Signal electrode
41 Ground electrode
50*a*, 50*a*', 50*a*" First shell
50*b*, 50*b*', 50*b*" Second shell

What is claimed is:

1. An electrical connector pair comprising:
a first connector mounted on a first substrate; and
a second connector mounted on a second substrate, wherein
the first connector includes
an electrically conductive first contact that connects to a signal electrode of the first substrate,
an electrically conductive second contact that connects to the signal electrode of the first substrate,
an electrically conductive first periphery surrounding wall that, when viewed from a direction normal to a main surface of the first substrate, is arranged so as to surround the first contact and the second contact, and that connects to a ground electrode of the first substrate,
an insulating first housing that includes a first holder that insulates and holds the first contact and the first periphery surrounding wall, and a second holder that insulates and holds the
second contact and the first periphery surrounding wall, and an electrically conductive first partition wall that is held by the first housing so as to partition a portion of a boundary between the first holder and the second holder in a state insulated from the first contact and the second contact, and that is grounded to the first substrate,
the second connector includes
an electrically conductive third contact that connects to a signal electrode of the second substrate, and that contacts the first contact when the first connector and the second connector are fitted together,
an electrically conductive fourth contact that connects to the signal electrode of the second substrate, and that contacts the second contact when the first connector and the second connector are fitted together,
an electrically conductive second periphery surrounding wall that, when viewed from a direction normal to a main surface of the second substrate, is arranged so as to surround the third contact and the fourth contact, and that connects to a ground electrode of the second substrate,
an insulating second housing that includes a third holder that insulates and holds the third contact and the second periphery surrounding wall, and a fourth holder that insulates and holds the fourth contact and the second periphery surrounding wall, and
an electrically conductive second partition wall that is held by the second housing so as to partition a portion of a boundary between the third holder and the fourth holder in a state insulated from the third contact and the fourth contact, and that is grounded to the second substrate, and
when the first connector and the second connector are fitted together, the first partition wall partitions a portion of boundary between the third holder and the fourth holder where the second partition wall is not formed, such that the first contact and the third contact cannot be seen from the second contact and the fourth contact.

2. The electrical connector pair according to claim 1, wherein
the first partition wall includes a first end that contacts the first substrate, and
a first ground connector that connects to the ground electrode of the first substrate is provided on the first end.

3. The electrical connector pair according to claim 1, wherein
the second partition wall includes a second end that contacts the second substrate, and
a second ground connector that connects to the ground electrode of the second substrate is provided on the second end.

4. The electrical connector pair according to claim 1, wherein in the first connector, the first partition wall is arranged such that the first contact cannot be seen from the second contact, and in the second connector, the second partition wall is arranged such that the third contact cannot be seen from the fourth contact.

5. The electrical connector pair according to claim 1, wherein the first partition wall and the second partition wall contact each other when the first connector and the second connector are fitted together.

6. The electrical connector pair according to claim 5, wherein the first partition wall and the second partition wall engage with each other when the first connector and the second connector are fitted together.

7. The electrical connector pair according to claim 1, wherein when the first connector and the second connector are fitted together, the second partition wall is arranged so as to overlap the first partition wall when viewing from the first contact and the third contact.

8. The electrical connector pair according to claim 1, wherein when the first connector and the second connector are fitted together, the first, second, third, and fourth contacts are doubly surrounded by the first periphery surrounding wall and the second periphery surrounding wall.

9. The electrical connector pair according to claim 1, wherein the first periphery surrounding wall and the second periphery surrounding wall engage with each other when the first connector and the second connector are fitted together.

10. The electrical connector pair according to claim 1, wherein an electrically conductive first coupler is provided that couples the first partition wall and the first periphery surrounding wall, and an electrically conductive second coupler is provided that couples the second partition wall and the second periphery surrounding wall.

11. The electrical connector pair according to claim 10, wherein the first coupler is a plate-like member that intersects a line normal to the main surface of the first substrate, and the second coupler is a plate-like member that intersects a line normal to the main surface of the second substrate.

12. The electrical connector pair according to claim 11, wherein an annular protrusion is formed, by the first partition wall, the first periphery surrounding wall, and the first coupler, that surrounds the first contact, and a recess is formed, by the second partition wall, the second periphery surrounding wall, and the second coupler, that surrounds the second contact, and into which the protrusion fits when the first connector and the second connector are fitted together.

13. The electrical connector pair according to claim 1, wherein in the first connector, a pair of the first holder is arranged so as to sandwich the second holder, and in the second connector, a pair of the third holder is arranged so as to sandwich the fourth holder.

* * * * *